(12) United States Patent
Suzuki et al.

(10) Patent No.: US 7,098,940 B2
(45) Date of Patent: Aug. 29, 2006

(54) SURVEILLANCE SYSTEM FOR WATCHING AN OBJECT THROUGH AN IMAGE

(75) Inventors: Kazuya Suzuki, Fujisawa (JP);
Toshikazu Saito, Yokohama (JP);
Kazuo Ota, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 659 days.

(21) Appl. No.: 09/886,891

(22) Filed: Jun. 21, 2001

(65) Prior Publication Data
US 2002/0003570 A1    Jan. 10, 2002

(30) Foreign Application Priority Data
Jun. 21, 2000    (JP) .............................. 2000-186527

(51) Int. Cl.
*H04N 7/18*    (2006.01)
*H04N 5/225*    (2006.01)
(52) U.S. Cl. ...................................... 348/143; 348/169
(58) Field of Classification Search ................ 348/143, 348/152, 169, 155
See application file for complete search history.

(56) References Cited

U.S. PATENT DOCUMENTS

| | | | | |
|---|---|---|---|---|
| 4,249,207 A | | 2/1981 | Harman | |
| 5,552,823 A | * | 9/1996 | Kageyama | 348/155 |
| 5,631,697 A | * | 5/1997 | Nishimura et al. | 348/172 |
| 5,982,420 A | * | 11/1999 | Ratz | 348/171 |
| 6,079,862 A | * | 6/2000 | Kawashima et al. | 382/103 |
| 6,392,692 B1 | * | 5/2002 | Monroe | 348/143 |
| 6,437,819 B1 | * | 8/2002 | Loveland | 348/143 |

FOREIGN PATENT DOCUMENTS

FR    2 725 062    9/1994

\* cited by examiner

*Primary Examiner*—Gims Philippe
*Assistant Examiner*—Erick Rekstad
(74) *Attorney, Agent, or Firm*—Pearne & Gordon LLP

(57) ABSTRACT

Herein disclosed is a surveillance system, comprising: a camera unit for transforming an image into an image signal and outputting the image signal, and a display unit having a screen and operative to transform into an image the image signal outputted by the camera unit to display the image on the screen. The camera unit is operative to automatically chase an object as a chasing target to have the display unit display the object as the chasing target. The display unit includes marker displaying means for displaying a marker on the screen; and chasing target determining means for determining the object spaced apart from the marker at a predetermined distance as the chasing target among the images displayed on the screen.

9 Claims, 18 Drawing Sheets

F I G. 5
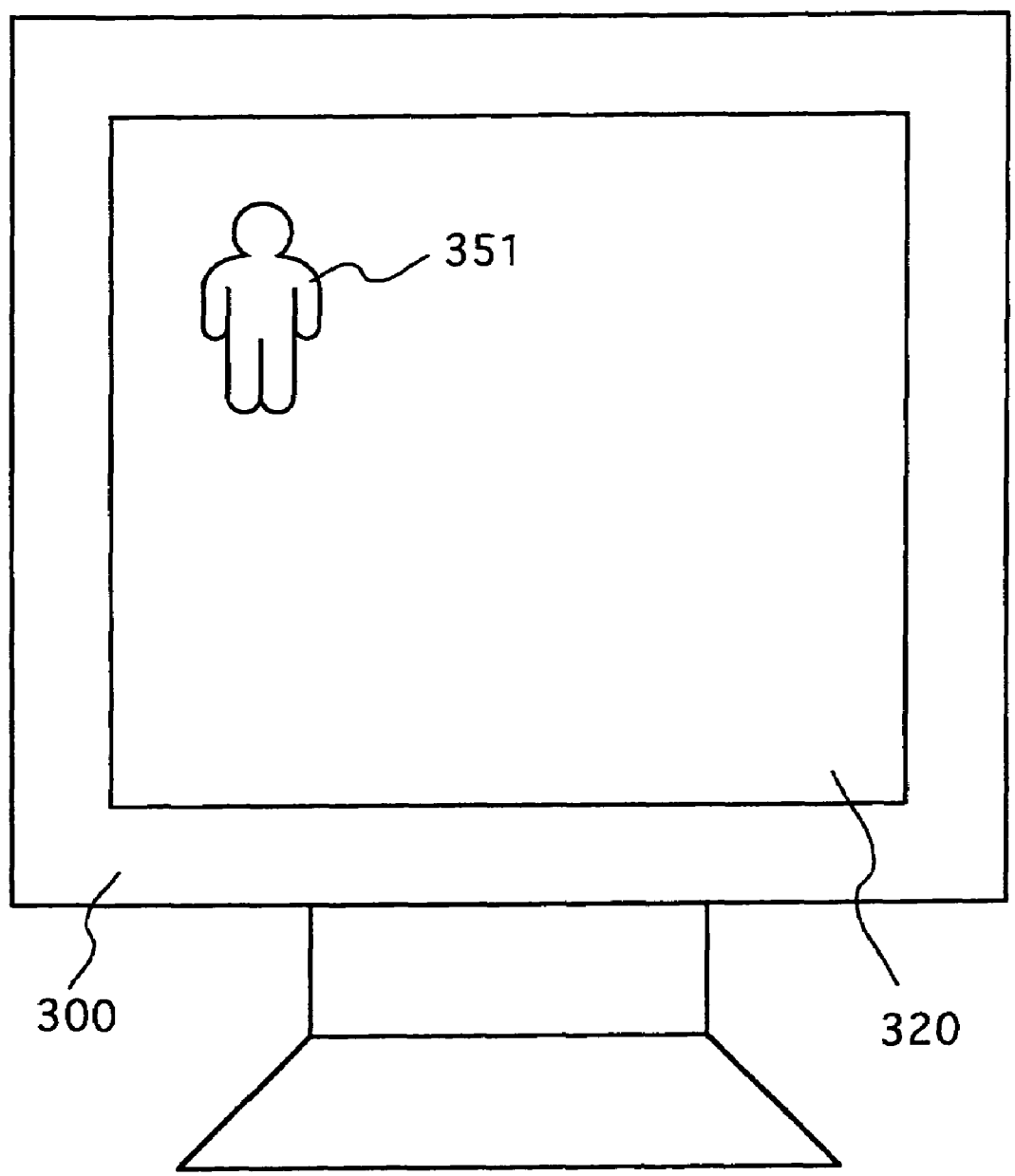

F I G. 6
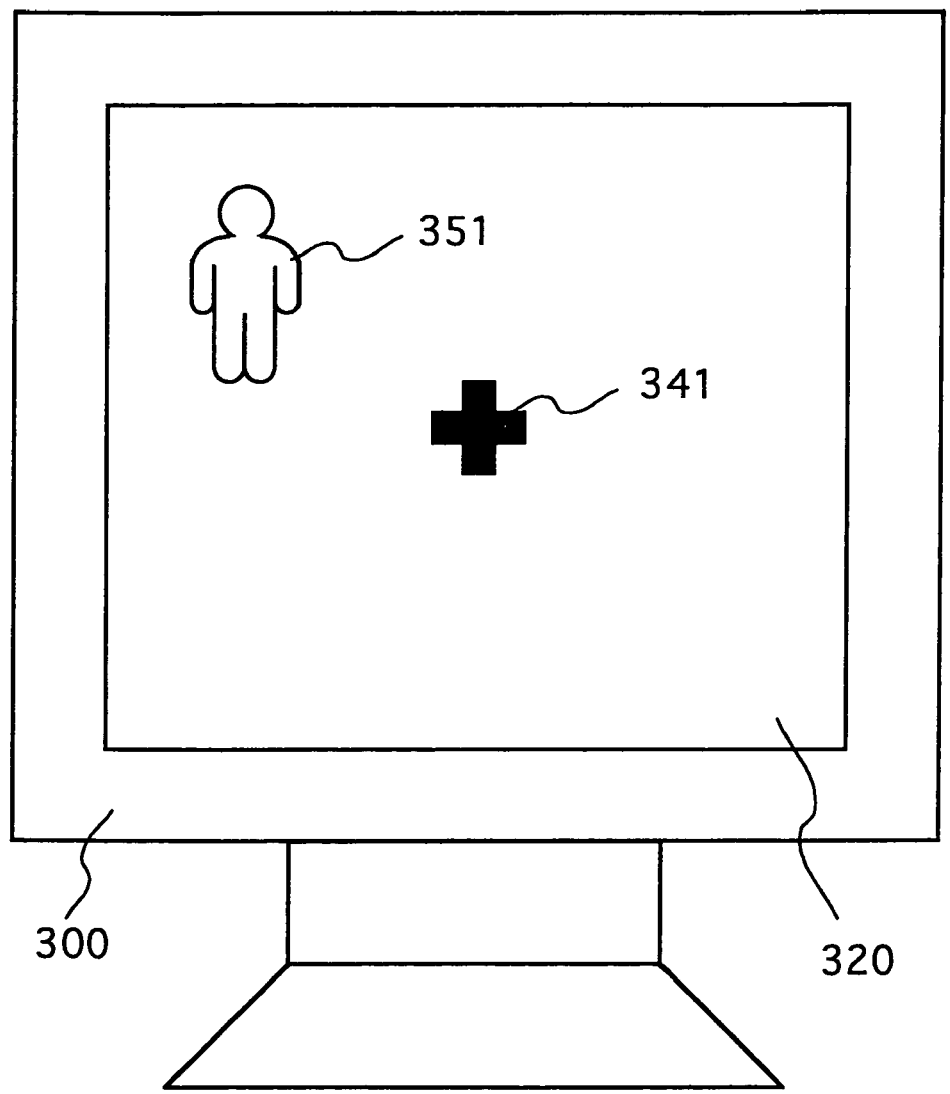

F I G. 7
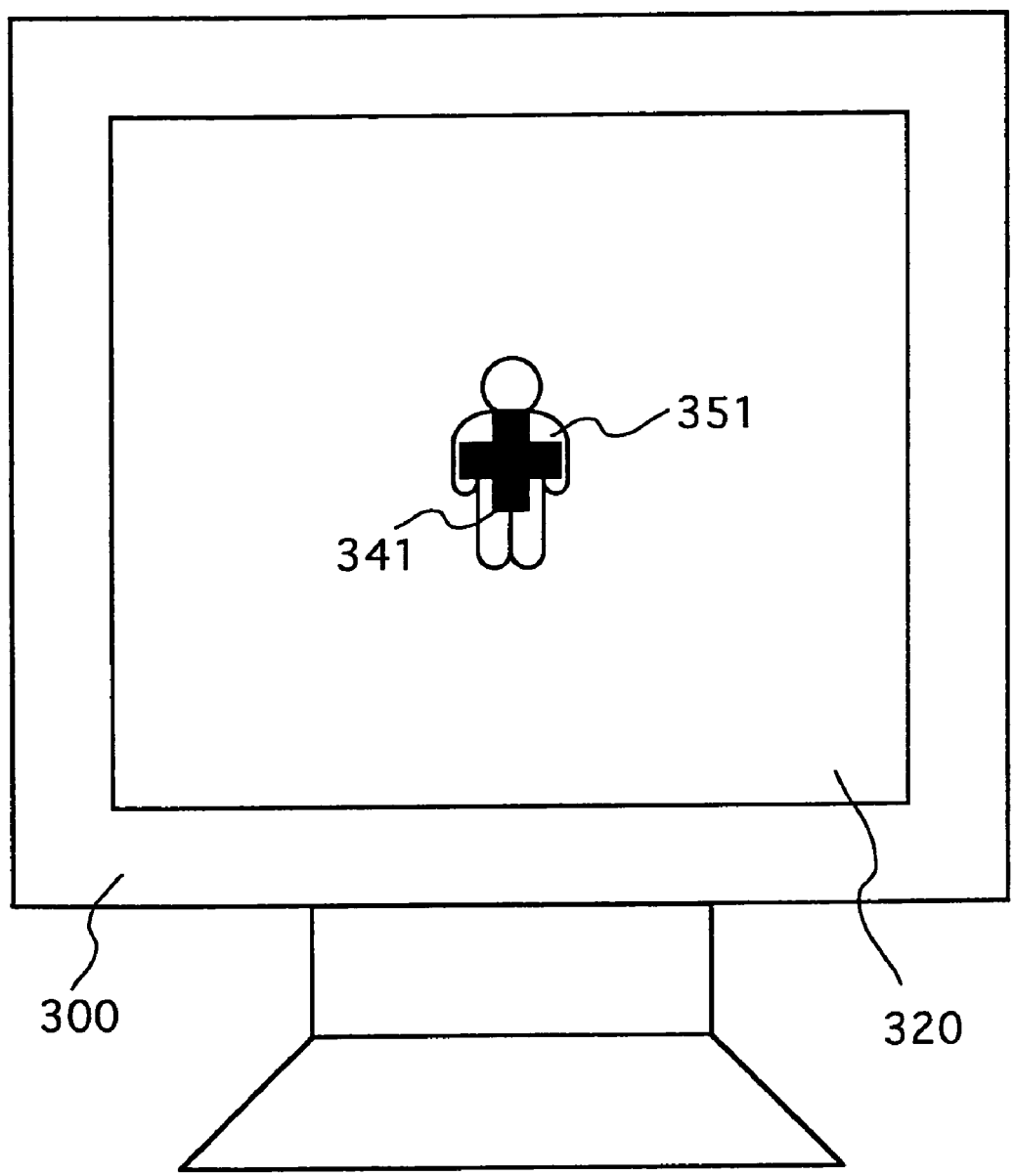

F I G. 1 3
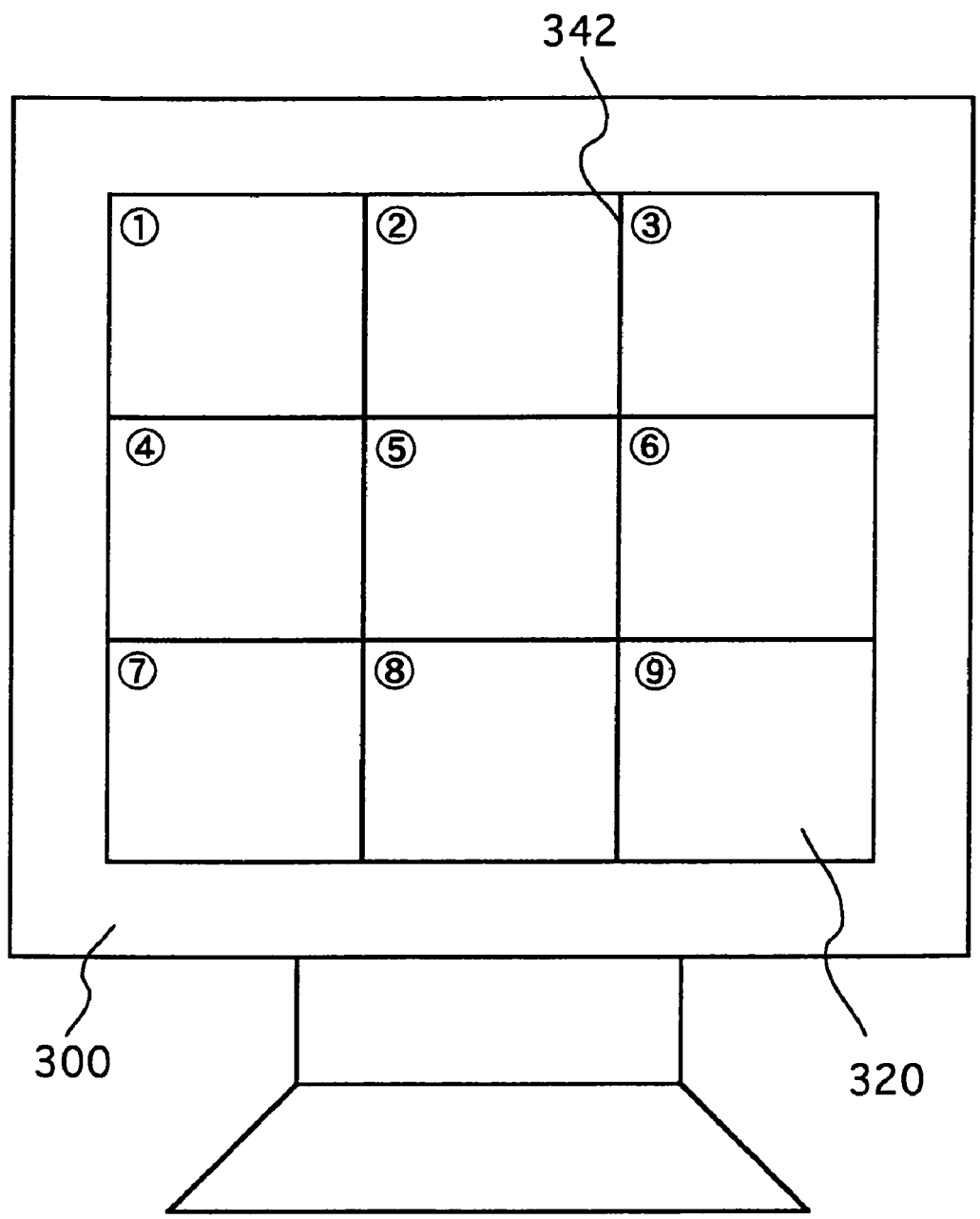

F I G. 1 4
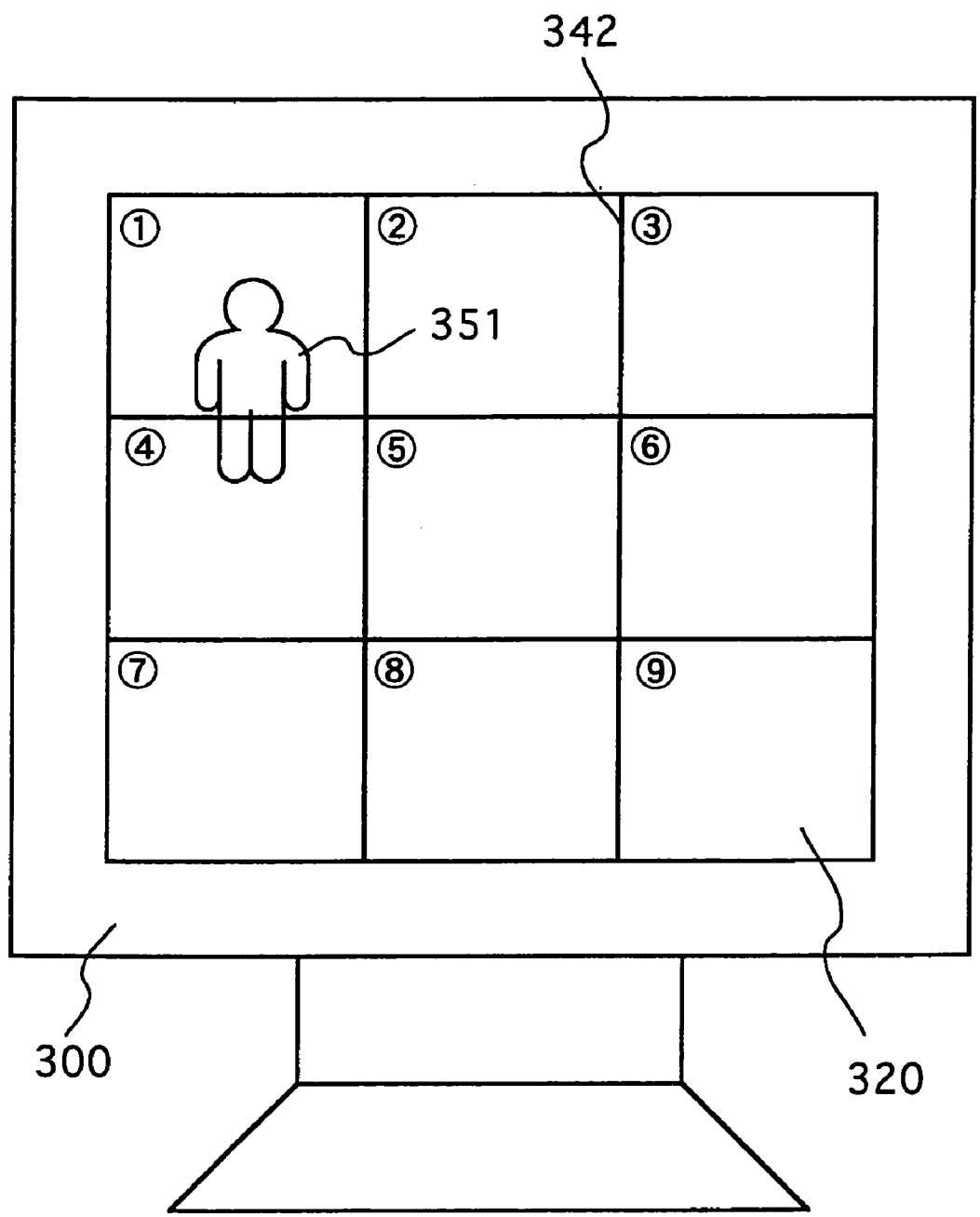

F I G. 1 7
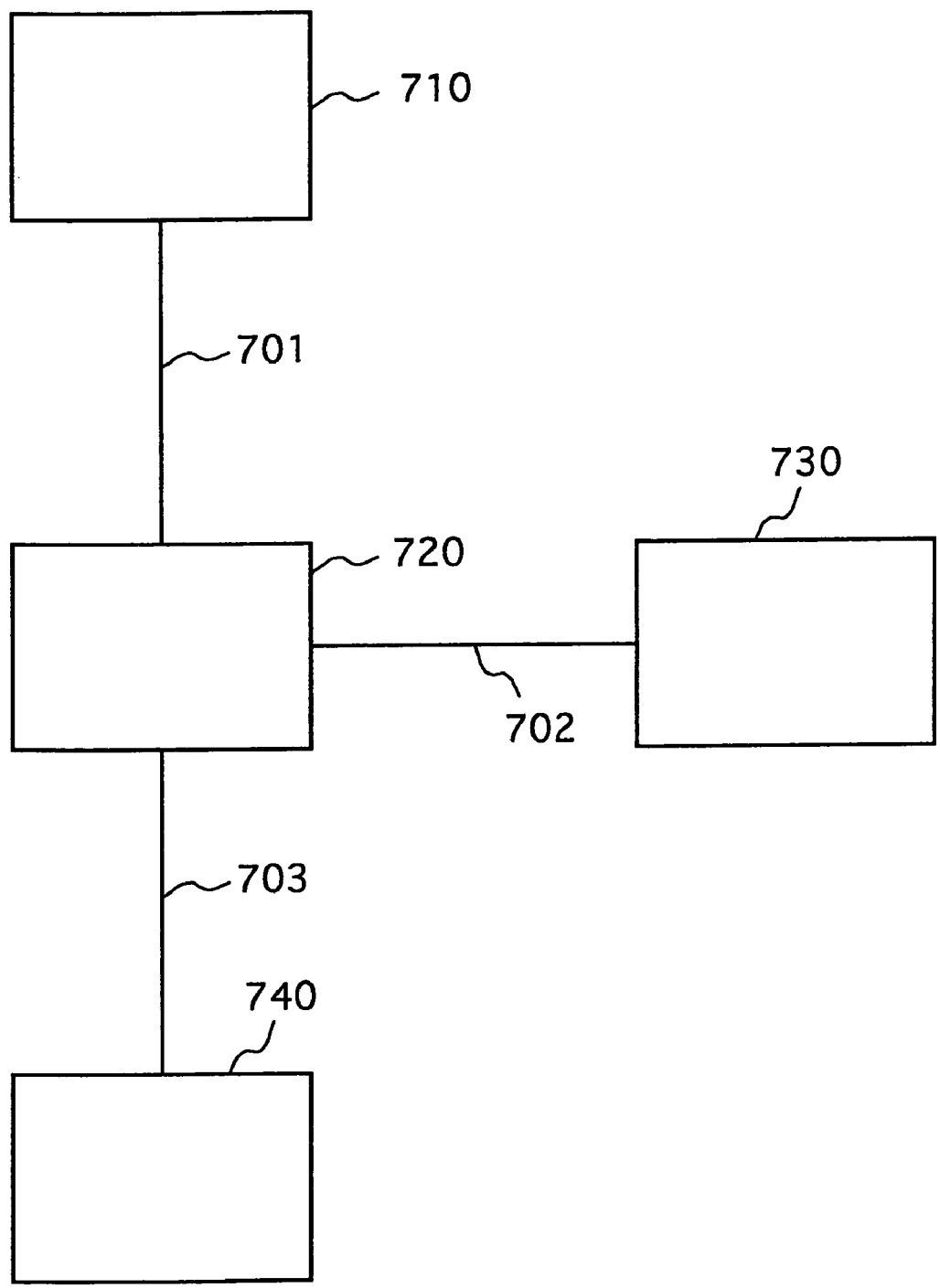

SURVEILLANCE SYSTEM FOR WATCHING AN OBJECT THROUGH AN IMAGE

BACKGROUND OF THE INVENTION

1. Field of the Invention

The present invention relates to a surveillance system especially for automatically watching and chasing an intruder and the like.

2. Description of the Related Art

Conventionally, there has been used a watching system for watching an intruder and the like. The conventional surveillance system is available for watching unqualified people and other intruders intruding into a special room that does not permit people with any permission from entering. One typical example of the surveillance system 700 is shown in FIG. 17 as comprising a camera unit 710, a display unit 730 for displaying an image taken by the camera unit 710, and a control unit 740 for controlling the operation of the camera unit 710 in response to operation commands inputted therein.

Description will now be made on how the image taken by the camera unit 710 is displayed on the screen of the display unit 730.

When the camera unit 710 is operated to take an image to be displayed on the screen of the display unit 730, the camera unit 710 is firstly driven by the control unit 740 to transform the image into an image signal outputted to a signal transmitting cable 701. The image signal thus outputted to the signal transmitting cable 701 is then transmitted to a system unit 720 before being inputted to the display unit 730.

The image signal is then transformed into an image to be displayed on the screen of the display unit 730.

The following description is directed to the operation of having the camera unit 710 operated in compliance with the operation commands inputted into the control unit 740.

In order to have the camera unit 710 operated by the operation commands of the control unit 740 to photograph an image, the control unit 740 is operated to receive the operation commands respectively indicative of the photographing directions, magnifications and the like inputted by an operator while he or she is watching the screen of the display unit 730. The control unit 740 inputted with the operation commands is then operated to transform the operation commands into a command signal to be transmitted to a signal transmitting cable 703. The command signal thus transmitted to the signal transmitting cable 703 is then inputted to the system unit 720 where the command signal is then transformed into a drive signal to drive the camera unit 710 to be outputted to the camera unit 710 by way of the signal transmitting cable 701. The camera unit 710 thus received the drive signal from the system unit 720 is at this time operated to change the photographing directions, magnifications and the like into new ones.

It is thus to be noted from the previously mentioned description that the camera unit 710 is operated in compliance with the operation commands inputted into the control unit 740.

As will be seen from the above, there has been described only one camera unit 710 provided in combination with the system unit 720, the display unit 730, the control unit 740 in the conventional surveillance system for the purpose of simplifying the description and assisting in understanding about the whole operation of the surveillance system. In reality, such a conventional surveillance system 800, however, is as shown in FIG. 18 to comprise a plurality of camera units 810, a system unit 820, a plurality of display units 830, and a plurality of control units 840. The conventional surveillance system 800 thus constructed allows an operator to selectively operate those control units 840 to input to control units 840 operation commands indicative of selecting one or more camera units 810 and one or more display units 830. This leads to the fact that the operator can select one or more control units 840 not only to have the image displayed on the screen of one or more display units 830 in accordance with the image taken by one or more selected camera units 810 but to operate the camera units 810 under the operation states optioned by the operator.

Here, the conventional surveillance system is generally known as being constructed to automatically detect and chase moving objects such as intruders and other objects to be taken by the camera units.

The conventional surveillance system encounters such a problem that it is impossible to decide which one of the objects is to be chased by the camera or cameras if there is a plurality of objects on the screen of the display unit.

SUMMARY OF THE INVENTION

It is therefore an object of the present invention to provide a surveillance system that can allow an operator to indicate which one of the objects is to be chased by the camera or cameras if there is a plurality of objects on the screen of the display unit.

The surveillance system according to the present invention comprises a camera unit for transforming an image into an image signal and outputting the image signal, and a display unit having a screen and operative to transform into an image the image signal outputted by the camera unit to display the image on the screen; the camera unit being operative to automatically chase an object as a chasing target to have the display unit display the object as the chasing target, the display unit including marker displaying means for displaying a marker on the screen; and chasing target determining means for determining the object spaced apart from the marker at a predetermined distance as the chasing target among the images displayed on the screen. The surveillance system according to the present invention thus constructed as previously mentioned can automatically watch and chase the object in response to the motion of the image of the object designated by the operator on the screen of the display unit.

In the surveillance system according to the present invention, the marker is constituted by a pointer, and the chasing target determining means is operative to determine the object superimposed by the pointer as the chasing target among the images displayed on the screen. The surveillance system according to the present invention thus constructed as previously mentioned can automatically watch and chase the object in response to the motion of the image of the object superimposed the marker on the image by the operator on the screen of the display unit.

The surveillance system according to the present invention further comprises a joystick operative to be inclined at its desired angular positions to output position signals respectively responsive to the desired angular positions, signal controlling means for receiving the position signals outputted by the joystick to control the driving operation of the camera unit and the movement of the pointer on the screen in response to the position signals outputted by the joystick, the controlling means assuming two controlling states consisting of a first controlling state to control the driving operation of the camera unit and a second controlling state to control the movement of the pointer on the screen in response to the position signals outputted by the joystick; and setting means for setting one of the controlling states selected from among the first and second controlling states, the camera unit being operated in response to the position signals outputted by the joystick under either one of the first and second controlling states set by the setting means. The surveillance system according to the present invention thus constructed as previously mentioned can automatically watch and chase the object in response to the motion of the image of the object superimposed the marker in response to the motion of the joystick operated by the operator on the screen of the display unit.

The marker displaying unit of the surveillance system according to the present invention is operative to display the pointer on the screen when the signal controlling means is operative to assume the second controlling state to control the movement of the pointer on the screen in response to the position signals. The surveillance system according to the present invention thus constructed as previously mentioned can easily superimpose the marker on the image of the specified object by the operator on the screen of the display unit when the signal controlling means is operative to assume the second controlling state to control the movement of the pointer on the screen in response to the position signals.

The marker of the surveillance system according to the present invention comprises forms a plurality of screen areas on the screen, and the chasing target determining means is operative to determine the object positioned within one predetermined screen area on the screen as the chasing target among the images displayed on the screen. The surveillance system according to the present invention thus constructed as previously mentioned can automatically watch and chase the object in response to the motion of the image of the object superimposed by the marker on the image by the operator on the screen of the display unit.

The marker displaying means of the surveillance system according to the present invention is operative to display the marker on the screen in superimposed relationship with the object, and the chasing target determining means is operative to determine the object on the screen in superimposed relationship with the marker as the chasing target among the markers displayed on the screen. The surveillance system according to the present invention thus constructed as previously mentioned can automatically watch and chase the object in response to the motion of the image of the object superimposed by the marker on the image by the operator on the screen of the display unit.

In the surveillance system according to the present invention, the chasing target determining means is operative to determine only one object as the chasing target to automatically be chased when the object is displayed on the screen. The surveillance system according to the present invention thus constructed as previously mentioned can automatically watch and chase the object in response to the motion of the image of the object designated by a operator on the screen of the display unit

BRIEF DESCRIPTION OF THE DRAWINGS

The present invention and may of the attendant advantages thereof will be better understood from the following detailed description when considered in connection with the accompanying drawings, wherein:

FIG. 5 is a front view similar to FIG. 4 but showing a state different from the state of the display unit shown in FIG. 4, FIG. 6 is a front view similar to FIGS. 4 and 5 but showing a state different from the state of the display unit shown in FIGS. 4 and 5, FIG. 7 is a front view similar to FIG. 4 to 6 but showing a state different from the state of the display unit shown in FIG. 4 to 6.

FIG. 13 is a front view of a display unit forming part of the surveillance system according to the present invention shown in FIG. 11, FIG. 14 is a front view similar to FIG. 13 but showing a state different from the state of the display unit shown in FIG. 13, FIG. 17 is a block diagram of the process to be performed by one of the conventional surveillance systems.

DESCRIPTION OF THE PREFERRED EMBODIMENTS

The following description will be directed to a plurality of preferred embodiments of the surveillance system according to the present invention.

The first embodiment of the surveillance system according to the present invention will now be described with reference to the drawings, in particular, to FIG. 1 to 8.

The construction of the surveillance system 100 according to the first embodiment of the present invention will firstly be described.

Figure 1:
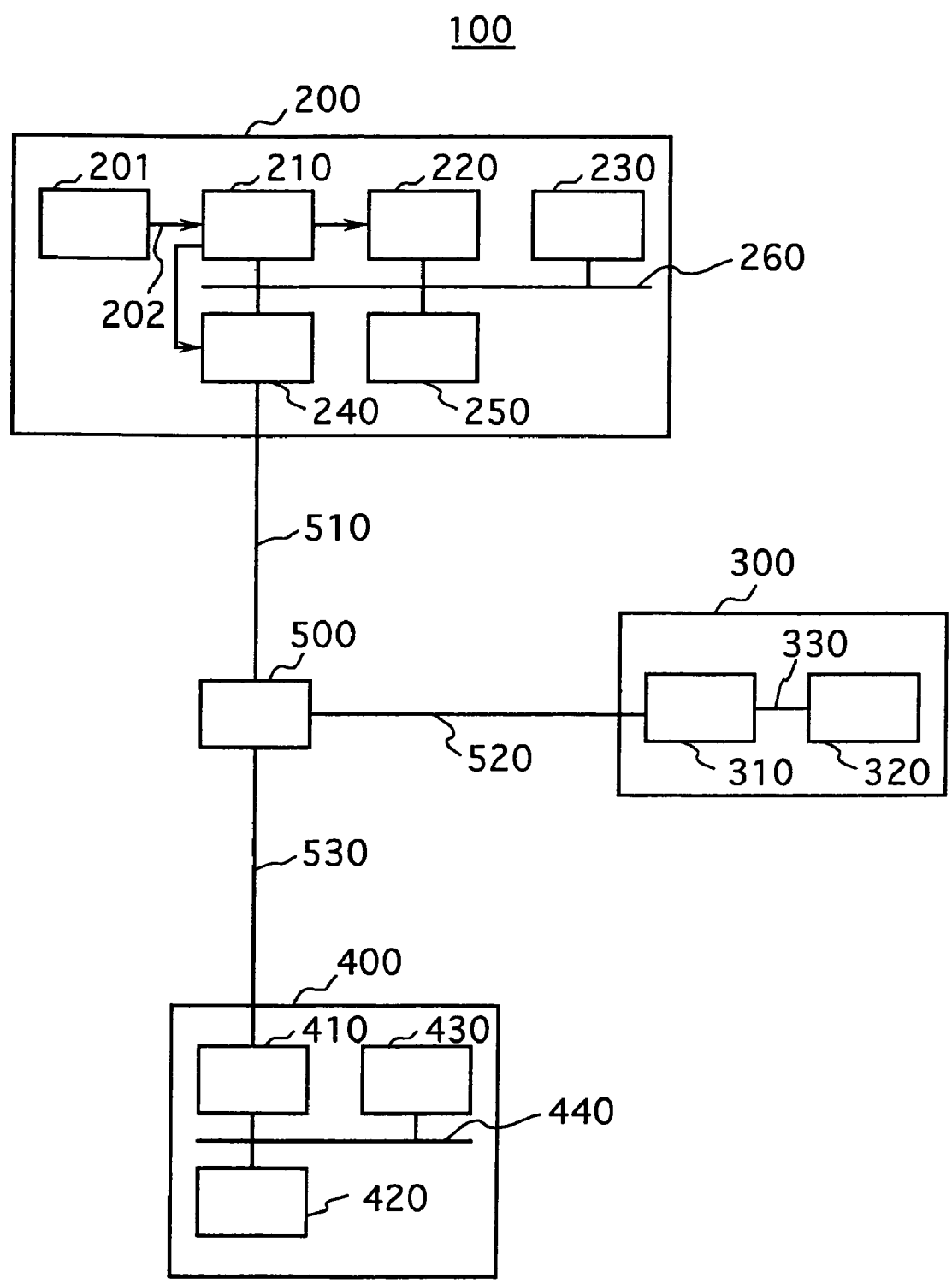
FIG. 1 is a block diagram of the process to be performed by the first embodiment of the surveillance system according to the present invention.

The surveillance system 100 is shown in FIG. 1 to comprise a camera unit 200 for transforming an image into an image signal and outputting the image signal, and a display unit 300 having a screen and operative to transform into an image the image signal outputted by the camera unit to display the image on the screen. The camera unit 200 is operative to automatically chase an object as a chasing target to have the display unit 300 display the object as the chasing target.

The surveillance system 100 further comprises a control unit 400 operative by an operator to control the camera unit 200 and the display unit 300, and a system unit 500 operative to have the camera unit 200, the display unit 300, and the control unit 400 electrically connected to one another. It is thus to be understood that the camera unit 200 is electrically connected to the system unit 500 by a signal transmitting line 510, the display unit 300 is electrically connected to the system unit 500 by a signal transmitting line 520, and the control unit 400 is electrically connected to the system unit 500 by a signal transmitting line 530.

The camera unit 200 comprises a photographing section 201 for transforming an image into an image signal and outputting the image signal, and an image signal processing section 210 for processing the image signal. The camera unit 200 further comprises a moving object detecting section 220 for detecting a moving object to be taken by the camera unit 200, and a chase control section 230 for automatically chasing the moving object as one of the chasing targets. The camera unit 200 comprises an exterior interface 240 electrically connected to the signal transmitting line 510, and a central processing unit, hereinafter referred to as a CPU 250, operative to control the signals among the image signal processing section 210, the moving object detecting section 220, the chase control section 230, and the exterior interface 240. The image signal processing section 210, the moving object detecting section 220, the chase control section 230, the exterior interface 240, and the CPU 250 are electrically connected to one another by a CPU bus 260. The photographing section 201, the image signal processing section 210, and the moving object detecting section 220 are electrically connected to one another by an image signal bus 202.

The display unit 300 comprises an exterior interface 310 electrically connected to the signal transmitting line 520, and an image display section, i.e., screen 320 for displaying an image transformed from the image signal thereby. The exterior interface 310 is electrically connected to the image display section 320 by a signal transmitting line 330.

The control unit 400 comprises an exterior interface 410 electrically connected to the signal transmitting line 530, a control section 420 operative by the operator to output a command signal in response to the control command made by the operator, and a CPU 430 operative to control the signals between the exterior interface 410 and the control section 420. The exterior interface 410, the control section 420, and the CPU 430 are electrically connected to one another by a CPU bus 440.

Figure 2:
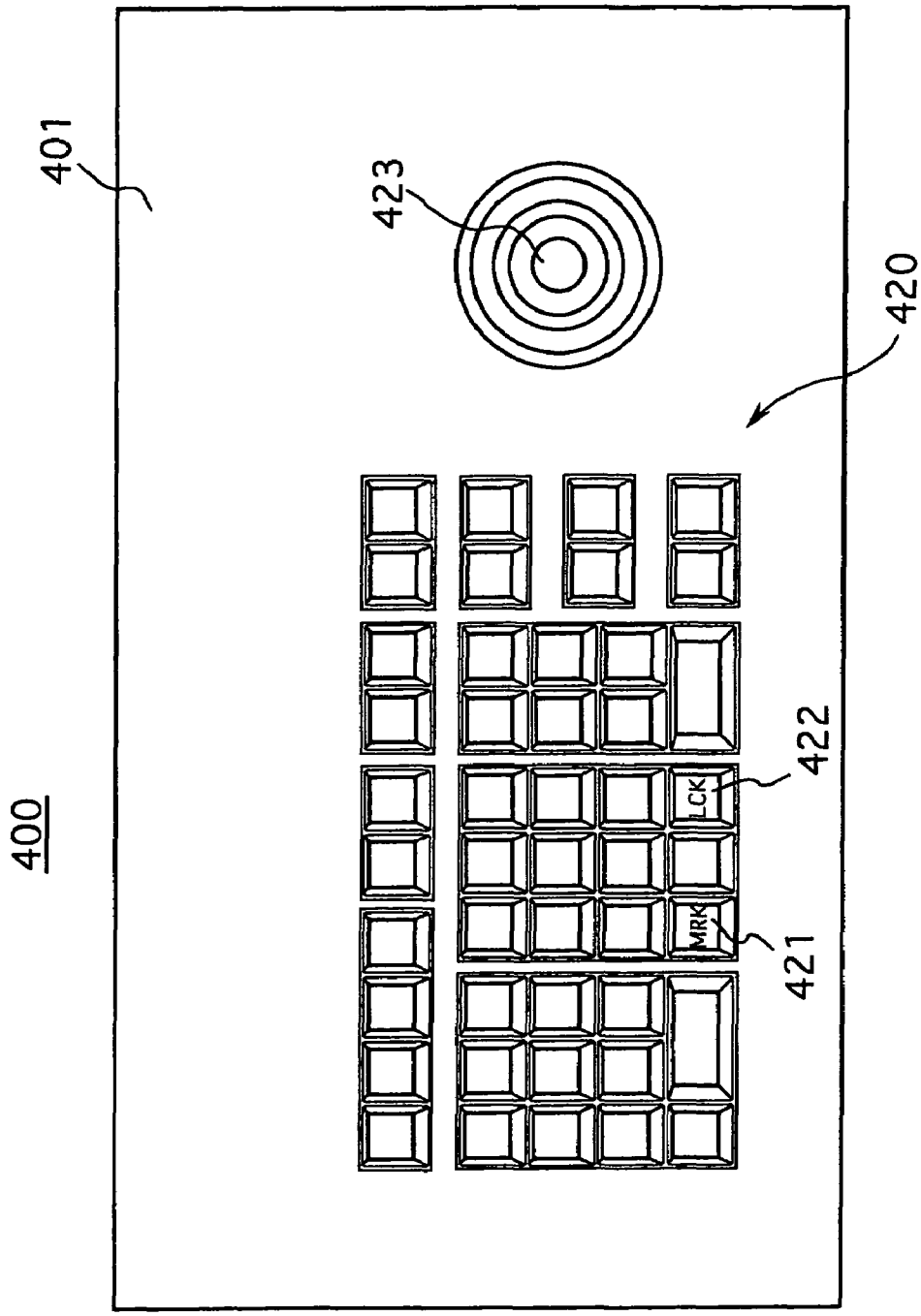
FIG. 2 is a plan view of an operation apparatus forming part of the surveillance system according to the present invention.
Figure 3:
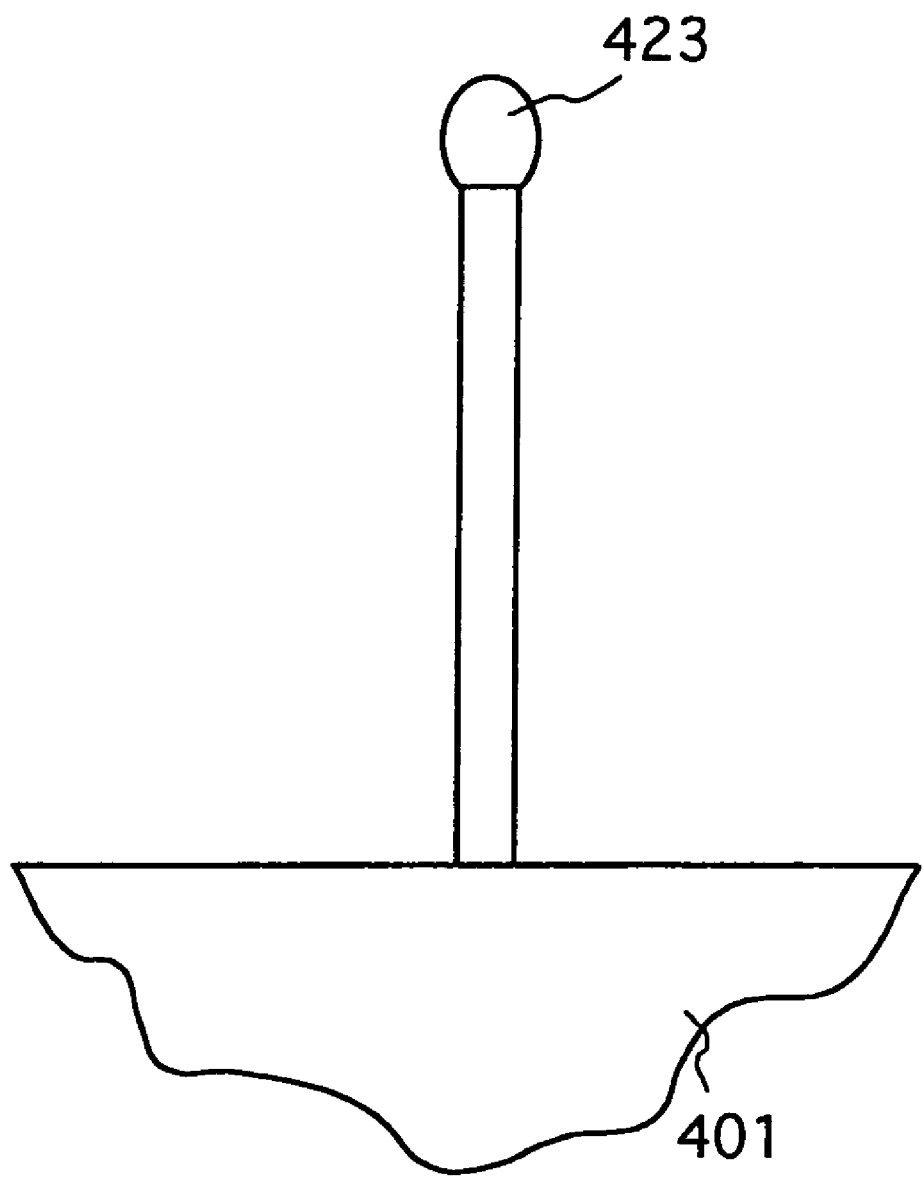
FIG. 3 is a fragmentary side view of a joystick and its vicinity forming part of the operation apparatus shown in FIG. 2.

The control unit 400 is shown in FIG. 2 to comprise a control unit body 401 having an upper surface, a plurality of keys including a MRK key 421 and a LCK key operatively arranged on the control unit body 401, and a joystick 423 which is of construction and shape now generally in use to output command signals indicative of the position, angle, direction thereof. The operations of the MRK key 421 and the LCK key will appear hereinafter as the description proceeds.

The image signal processing section 210 for processing the image signal is operative to allow a marker to be displayed by the display unit 300. In the present embodiment of the surveillance system, the marker is constituted by a pointer 341 which can point a desired position on the screen 320 as will be seen in FIG. 4. The moving object detecting section 220 and the chase control section 230 are operative to determine the object spaced apart from the pointer 341 at a predetermined distance as one of chasing targets among the images displayed on the screen. Here, the object spaced apart from the pointer 341 at a predetermined distance is intended to include an object superimposed by the pointer 341. The desired position on the screen 320 is intended to mean a point or an area spacious to some extent on the screen 320 but not mean a geometrical point on the screen 320.

The operation of the surveillance system 100 according to the present embodiment will be described hereinafter.

The following description will now be directed to the case that the operator is assumed to operate the surveillance system 100 while automatically chasing and watching a suspicious person as an object to be taken by the camera unit 200.

When the image of the suspicious person is taken by the photographing section 201 of the camera unit 200, the image is transformed into the image signal to be outputted to the image signal bus 202 by the photographing section 201 of the camera unit 200. The image signal thus outputted to the image signal bus 202 is outputted to the image signal processing unit 210 and the signal transmitting line 510 through the exterior interface 240.

The image signal thus outputted to the signal transmitting line 510 is inputted into the display unit 320 by way of the signal transmitting line 510, the system unit 500, the signal transmitting line 520, the exterior interface 310, and the signal transmitting line 330. The display unit 320 is operated to transform the image signal into the image, identical to the image taken by the camera unit 200, to be displayed on the screen 320 and when the display unit 320 receives the image signal inputted therein.

In this way, the image of the suspicious person taken by the camera unit 200 is displayed on the screen 320 of the display unit 300 as will be seen from an object 351 in FIG. 5.

If the suspicious person is moved, the operator operates the control section 420 of the control unit 400 while watching the image of the suspicious person on the screen 320 of the display unit 300 to change the photographing directions, magnifications and the like of the photographing section 201 of the camera unit 200 to ensure that the image of the suspicious person is displayed on the screen 320 of the display unit 300.

The following detailed description will be concerned with the operation of the control section 420 of the control unit 400 that is operated by the operator. The control section 420 of the control unit 400 is operated by the operator to output a command signal in response to the operation commands made by the operator to the CPU bus 440. The command signal thus outputted to the CPU bus 440 is inputted into the CPU 430. The CPU 430 with the command signal inputted thereinto is operated to output the command signal to the signal transmitting line 530 through CPU bus 440 and the exterior interface 410.

The command signal outputted to the signal transmitting line 530 is inputted into the CPU 250 by way of the signal transmitting line 530, the control unit 500, the signal transmitting line 510, the exterior interface 240, and the CPU bus 260. In this way, the CPU 430 is operated by the operation commands of the operator to change the photographing directions, magnifications and the like of the photographing section 201 of the camera unit 200 to ensure that the image of the suspicious person is displayed on the screen 320 of the display unit 300. Here, the joystick 423 is available for the change of the photographing directions, magnifications and the like of the photographing section 201 of the camera unit 200.

When the photographing directions, magnifications and the like of the photographing section 201 of the camera unit 200 is changed by the operator, the image is changed on the screen 320 of the display unit 300 in response to the change of the photographing directions, magnifications and the like of the photographing section 201 of the camera unit 200.

From the foregoing description, it will be understood that the surveillance system 100 is operated by the operator to ensure that the object such as the suspicious person is watched on the screen 320 of the display unit 300.

The following description will then be directed to the case that a specified object such as for example the suspicious person is automatically chased and watched by the surveillance system 100.

It is assumed that the specified object 351 is displayed on the screen 320 of the display unit 300 and decided as a suspicious person by the operator. If the operator wants to continue automatically chasing and watching the suspicious person with the surveillance system 100, he or she pushes the MRK key 421 of the control unit 400.

With the MRK key 421 pushed by the operator, the command signal indicative of the pushed action of the MRK key 421 is inputted into the CPU 250 in a similar manner to the operation command made by the operator with the joystick 423.

The CPU 250 inputted with the command signal indicative of the pushed action of the MRK key 421 is operated to have the image signal processing section 210 process the image signal to be outputted to the image signal bus 202 to ensure that the pointer is displayed in addition to the image previously displayed as taken by the camera unit 200 on the screen 320 of the display unit 300. When the image signal processing section 210 is operated to process the image signal to be outputted to the image signal bus 202 to ensure that the pointer 341 is displayed in addition to the image previously displayed as taken by the camera unit 200 on the screen 320 of the display unit 300, the pointer 341is displayed in addition to the image previously displayed on the screen 320 of the display unit 300 as shown in FIG. 6.

The present embodiment of the surveillance system 100 is so constructed to have the pointer 341 remain at the center of the screen 320 of the display unit 300. This means that the pointer 341 can at all times be positioned at the center of the screen 320 of the display unit 300 in superimposed relationship with the image of the object 351 if the control unit 400 is operated by the operator to change the photographing directions, magnifications and the like of the camera unit 200.

When the LCK key 422 is pushed by the operator with the pointer 341 being superimposed with the image of the object 351 on the screen 320 of the display unit 300, the command signal indicative of the pushed action of the LCK key 422 is inputted into the CPU 250 in a similar fashion to the previous pushed action of the MRK key421.

The CPU 250 inputted with the command signal indicative of the pushed action of the LCK key 422 is operated to have the moving object detecting section 220 and the chase control section 230 work together to determine the image of the object 351 superimposed by the pointer 341 on the screen 320 as a chasing target. When the image of the object 351 is determined as a chasing target by the moving object detecting section 220 and the chase control section 230, the moving object detecting section 220 is operated to detect the image of the object 351 as determined to be a chasing target, and the chase control section 230 is at the same time operated to have the camera unit 200 of the change the photographing directions, magnifications and the like to ensure that the targeted object 351 is chased by the camera unit 200. This leads to the fact that the targeted object 351 is automatically and at all times displayed on the screen 320 of the display unit 300 without any operation command made by the operator.

After the CPU 250 is operated to have the moving object detecting section 220 and the chase control section 230 work together to determine the image of the object 351 superimposed by the pointer 341 on the screen 320 as a chasing target, the image signal processing section 210 is operated to process the image signal to be outputted to the image signal bus 202 in order that the pointer 341 is deleted from the screen 320 of the display unit 300.

From the above description, it is to be appreciated that the surveillance system 100 according to the present invention is operated by the operator to have the specific object such as the suspicious person automatically chased and watched.

While there has so far been described about the face that the above embodiment of the surveillance system 100 is operated to have only one object displayed on the screen 320 of the display unit 300, the surveillance system 100 according to the present invention may be operated to automatically chase and watch only one object selected from among three objects 352, 353 and 354 displayed on the screen 320 of the display unit 300. The surveillance system 100 according to the present invention which can perform the operation of automatically chasing and watching only one object selected from among many objects is especially effective for the operator to request the operation previously mentioned.

According to the present invention, the surveillance system 100 is constructed to automatically chase and watch the object when there appears only one image of the object on the screen 320 of the display unit 300. For example in the case that there appears only one image of the object on the screen 320 of the display unit 300 as shown in FIG. 5, the surveillance system 100 may be operated to automatically chase and watch only one object on the screen 320 of the display unit 300.

Though the surveillance system 100 exemplified by the present invention comprises a MRK key 421 and a LCK key 422 constituting the state setting means for selectively setting the camera operating state under which the camera unit 200 is moved and the pointer moving state under which the pointer 341 is moved, the surveillance system 100 according to the present invention may comprise any other form of the state setting means as long as the state setting means can serve to selectively set either one of the above states under the condition that the CPU 250 is inputted with either one of the command signals.

Figure 4:
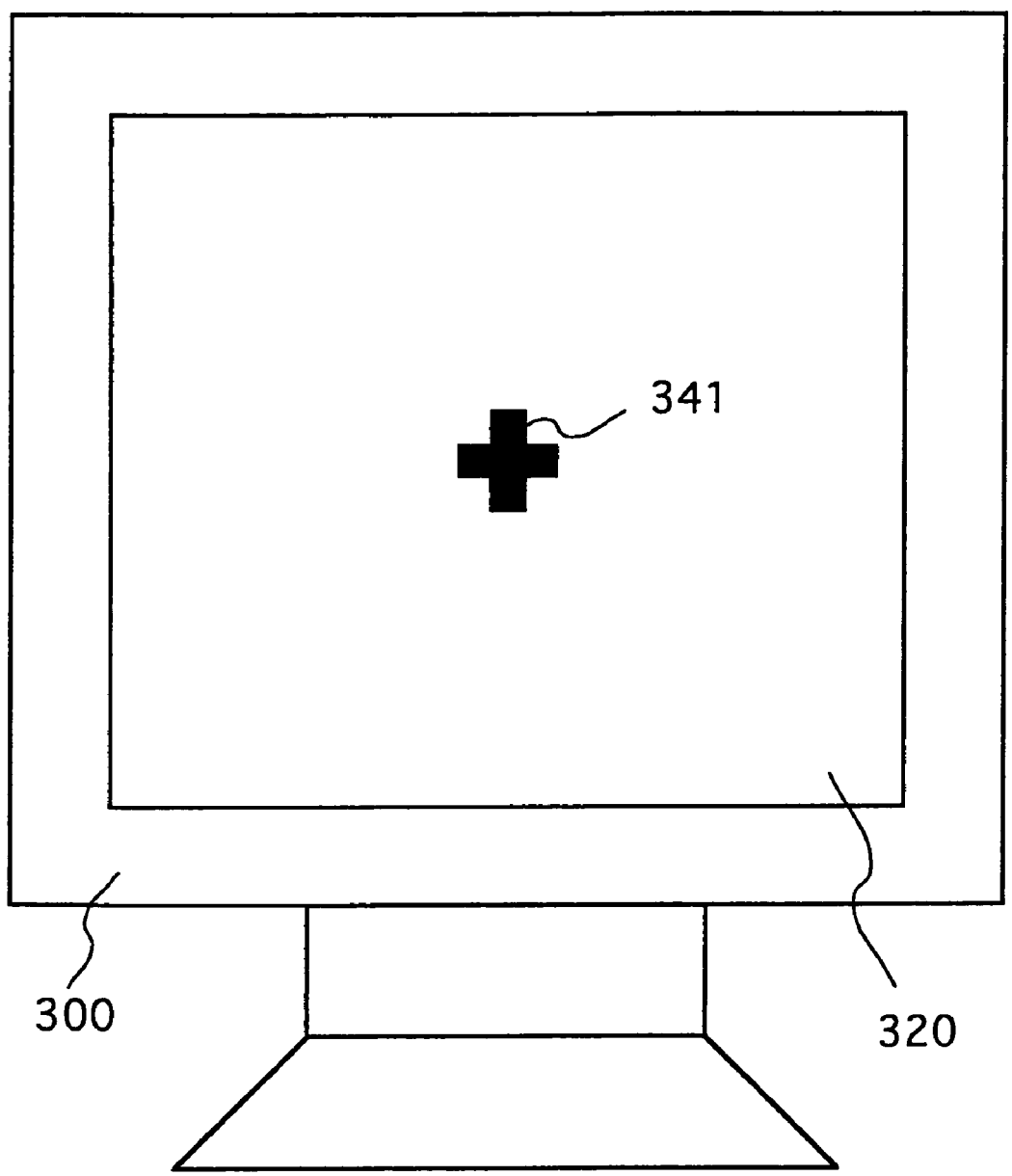
FIG. 4 is a front view of a display unit forming part of the surveillance system according to the present invention shown in FIG. 1.

The pointer 341 of the above embodiment of the surveillance system 100 is of the shape as shown in FIG. 4, however, may be of any other forms which can point the specified object on the screen 320 of the display unit 300.

[Second Embodiment]

The second embodiment of the surveillance system according to the present invention will then be described with reference to the drawings, in particular to FIGS. 2, 5, 6, 8 to 10.

The construction of the surveillance system 101 according to the second embodiment of the present invention will firstly be described.

Figure 9:
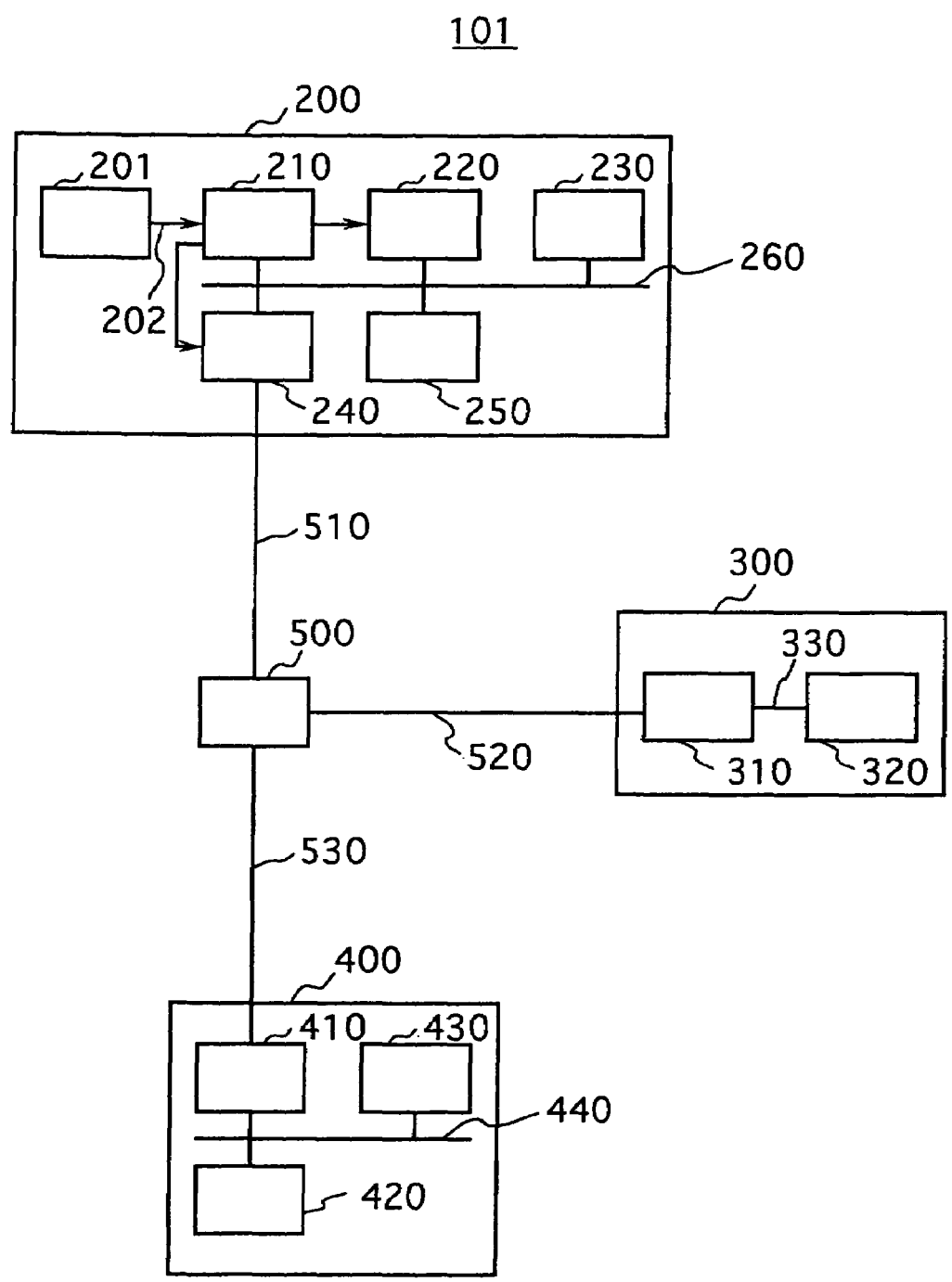
FIG. 9 is a block diagram of the process to be performed by the second embodiment of the surveillance system according to the present invention.
Figure 10:
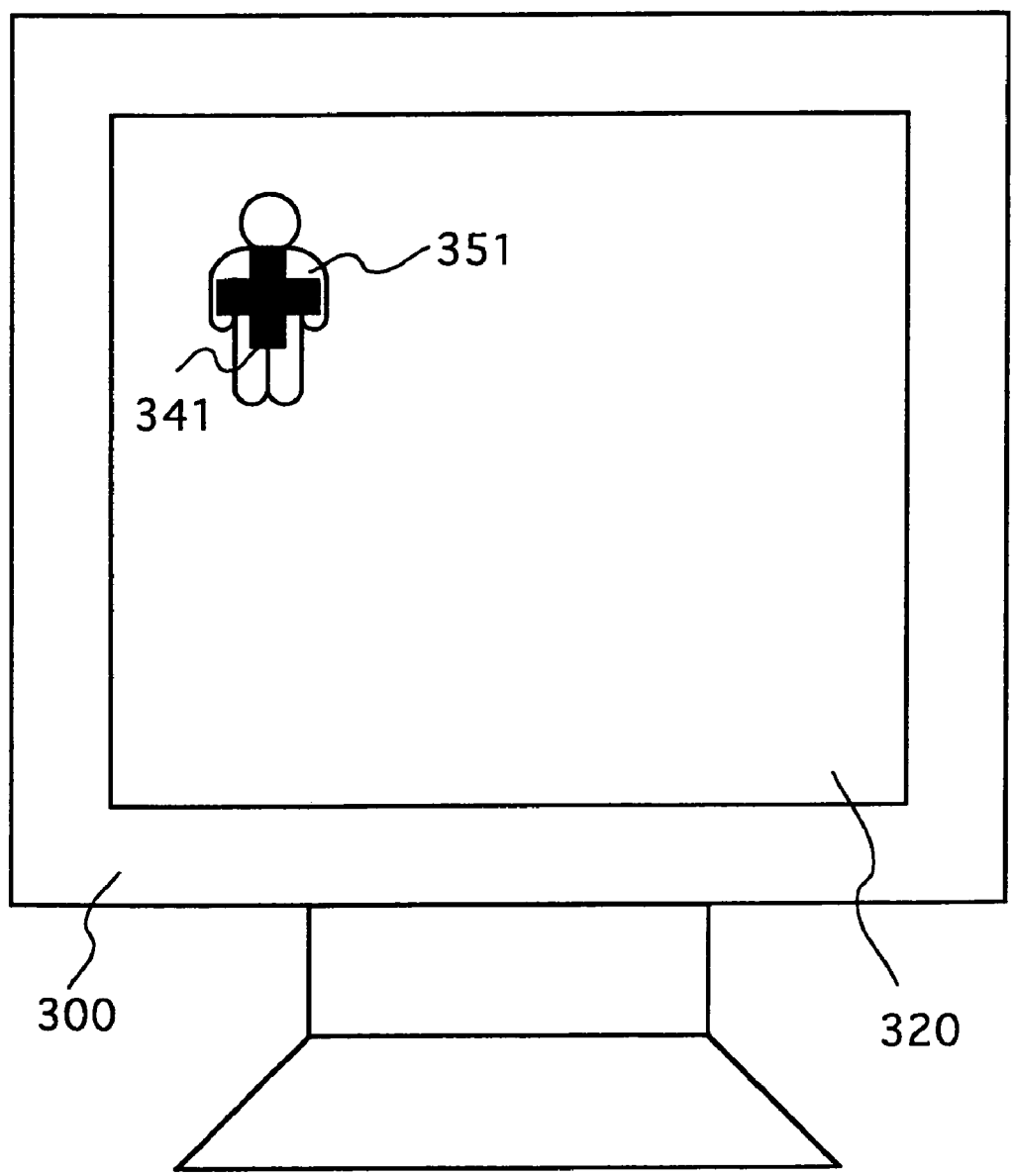
FIG. 10 is a front view of a display unit forming part of the surveillance system according to the present invention shown in FIG. 9.

The surveillance system 101 according to the second embodiment of the present invention is shown in FIG. 9 as almost the same in construction as the surveillance system 100 according to the first embodiment of the present invention. In contrast to the surveillance system 100 according to the first embodiment of the present invention which comprises a camera unit 200 including a CPU 250 for controlling the signals among the exterior interface 240 electrically connected to the signal transmitting line 510, the photographing section 201, the image signal processing section 210, the moving object detecting section 220, and the chase control section 230, the surveillance system 101 according to the second embodiment of the present invention comprises a camera unit 200 which also includes a CPU 251 for controlling the signals among the exterior interface 240 electrically connected to the signal transmitting line 510, the photographing section 201, the image signal processing section 210, the moving object detecting section 220, the chase control section 230, and the exterior interface 240. The CPU 251 is inputted with the position signal indicative of the inclined position of the joystick 423 and thus replaces the CPU 250 of the surveillance system 100.

The MRK key 421 and the LCK key 422 collectively constitute state setting means for setting any one of the states of the CPU 251 including a first controlling state, i.e., a camera operating state under which the camera unit 200 is operated, and a second controlling state, i.e., a pointer moving state under which the pointer is moved on the screen 320 of the display unit 300 in response to the command signal inputted into the CPU 251 by the joystick 423.

The operation of the surveillance system 101 according to the present embodiment will be described hereinafter.

The operation of the surveillance system 101 according to the second embodiment is almost the same as that of the surveillance system 100 according to the first embodiment except for the following operation.

The following description will then be directed to the case that the operator is assumed to operate the surveillance system 100 while automatically chasing and watching a suspicious person as an object to be taken by the camera unit 200.

It is assumed that the specified object 351 is displayed on the screen 320 of the display unit 300 and decided as a suspicious person by the operator. If the operator wants to continue automatically chasing and watching the suspicious person with the surveillance system 101, he or she pushes the MRK key 421 of the control unit 400.

With the MRK key 421 pushed by the operator, the command signal indicative of the pushed action of the MRK key 421 is inputted into the CPU 251 in a similar manner to the operation command made by the operator with the joystick 423.

The CPU 250 inputted with the command signal indicative of the pushed action of the MRK key 421 is operated to have the image signal processing section 210 process the image signal to be outputted to the image signal bus 202 to ensure that the pointer 341 is displayed in addition to the image 351 previously displayed as taken by the camera unit 200 on the screen 320 of the display unit 300. When the image signal processing section 210 is operated to process the image signal to be outputted to the image signal bus 202 to ensure that the pointer 341 is displayed in addition to the image previously displayed as taken by the camera unit 200 on the screen 320 of the display unit 300, the pointer 341 is displayed in addition to the image 351 previously displayed on the screen 320 of the display unit 300 as shown in FIG. 6.

The CPU 251 with the command signal indicative of the pushed action of the MRK key 421 and with the command signal indicative of the inclined position of the joystick 423 is operated to be changed in response to the command signal inputted into the CPU 251 by the joystick 423 from the camera operating state under which the camera unit 200 is operated to the pointer moving state under which the pointer 341 is moved on the screen 320 of the display unit 300.

Under the pointer moving state of the CPU 251 in the present embodiment of the surveillance system, the pointer 341 is moved on the screen 320 of the display unit 300 in response to the inclined position of the joystick 423 caused by the operator while the photographing directions of the camera unit 200 is not changed even with the operation of the joystick 423 by the operator. This means that the pointer 341 can at all times be positioned in superimposed relationship with the image 351 of the object on the screen 320 of the display unit 300 with the photographing direction of the camera unit 200 being held at a standstill if the joystick 423 is operated by the operator to move the pointer on the screen 320 of the display unit 300.

When the LCK key 422 is pushed by the operator with the pointer 341 being superimposed with the image of the object 351 on the screen 320 of the display unit 300, the command signal indicative of the pushed action of the LCK key 422 is inputted into the CPU 251 in a similar fashion to the previous pushed action of the MRK key421.

The CPU 250 inputted with the command signal indicative of the pushed action of the LCK key 422 is operated to have the moving object detecting section 220 and the chase control section 230 work together to determine the image of the object 351 superimposed by the pointer 341 on the screen 320 as a chasing target. When the image of the object 351 is determined as a chasing target by the moving object detecting section 220 and the chase control section 230, the moving object detecting section 220 is operated to detect the image of the object 351 as determined to be a chasing target, and the chase control section 230 is at the same time operated to have the camera unit 200 of the change the photographing directions, magnifications and the like to ensure that the targeted object 351 is chased by the camera unit 200. This leads to the fact that the targeted object 351 is automatically and at all times displayed on the screen 320 of the display unit 300 without any operation command made by the operator.

After the CPU 251 is operated to have the moving object detecting section 220 and the chase control section 230 work together to determine the image of the object 351 superimposed by the pointer 341 on the screen 320 as a chasing target, the image signal processing section 210 is operated to process the image signal to be outputted to the image signal bus 202 in order that the pointer 341 is deleted from the screen 320 of the display unit 300.

When the CPU 251 is inputted with the command signal indicative of the pushed action of the LCK key 422, the CPU 251 is operated to change the state under which the pointer 341 is moved to the state under which the camera unit 200 is moved.

From the foregoing description, it will be understood that the surveillance system 101 is operated by the operator to ensure that the object such as the suspicious person is automatically watched and chased on the screen 320 of the display unit 300.

Figure 8:
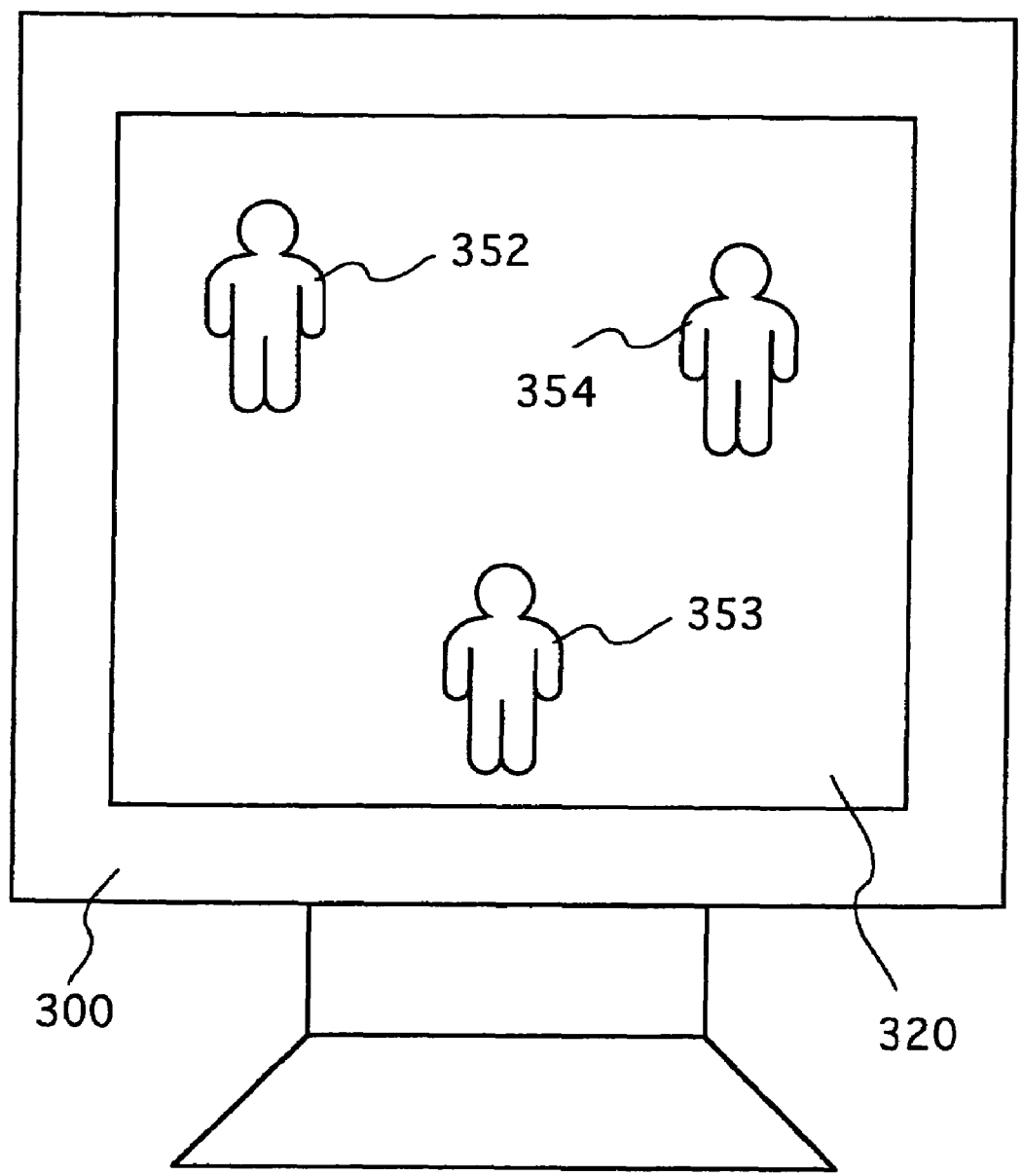
FIG. 8 is a front view similar to FIG. 4 to 7 but showing a state different from the state of the display unit shown in FIG. 4 to 8.

Although the previously mentioned description is concerned with the case that what is displayed on the screen 320 of the display unit 300 is only one object, the surveillance system according the present invention is advantageous if the surveillance system 101 is available for specifying one object selected among a plurality of objects, i.e., objects 352, 353 and 354 on the screen 320 of the display unit 300 for example as shown in FIG. 8 to automatically watch and chase the specified object.

The surveillance system according to the present invention may be designed to determine one object as a chasing target to be automatically watched and chased on the screen 320 of the display unit 300 if what is displayed on the screen 320 of the display unit 300 is only one object. For only one object 351 on the screen 320 of the display unit 300 to be watched and chased by the operator, the surveillance system according to the present invention may be designed to be capable of automatically watching and chasing the object 351 on the screen 320 of the display unit 300.

Though the surveillance system 100 exemplified by the present invention comprises a MRK key 421 and a LCK key 422 constituting the state setting means for selectively setting the state under which the camera unit 200 is moved and the state under which the pointer 341 is moved, the surveillance system 100 according to the present invention may comprise any other form of the state setting means as long as the state setting means can serve to selectively set either one of the above states under the condition that the CPU 251 is inputted with either one of the command signals.

The pointer 341 of the above embodiment of the surveillance system 101 is of the shape as shown in FIG. 6, however, may be of any other forms which can point the specified object on the screen 320 of the display unit 300.

The third embodiment of the surveillance system according to the present invention will now be described with reference to the drawings, in particular to FIGS. 5, 8, 11 to 14.

The construction of the surveillance system 102 according to the first embodiment of the present invention will firstly be described.

Figure 11:
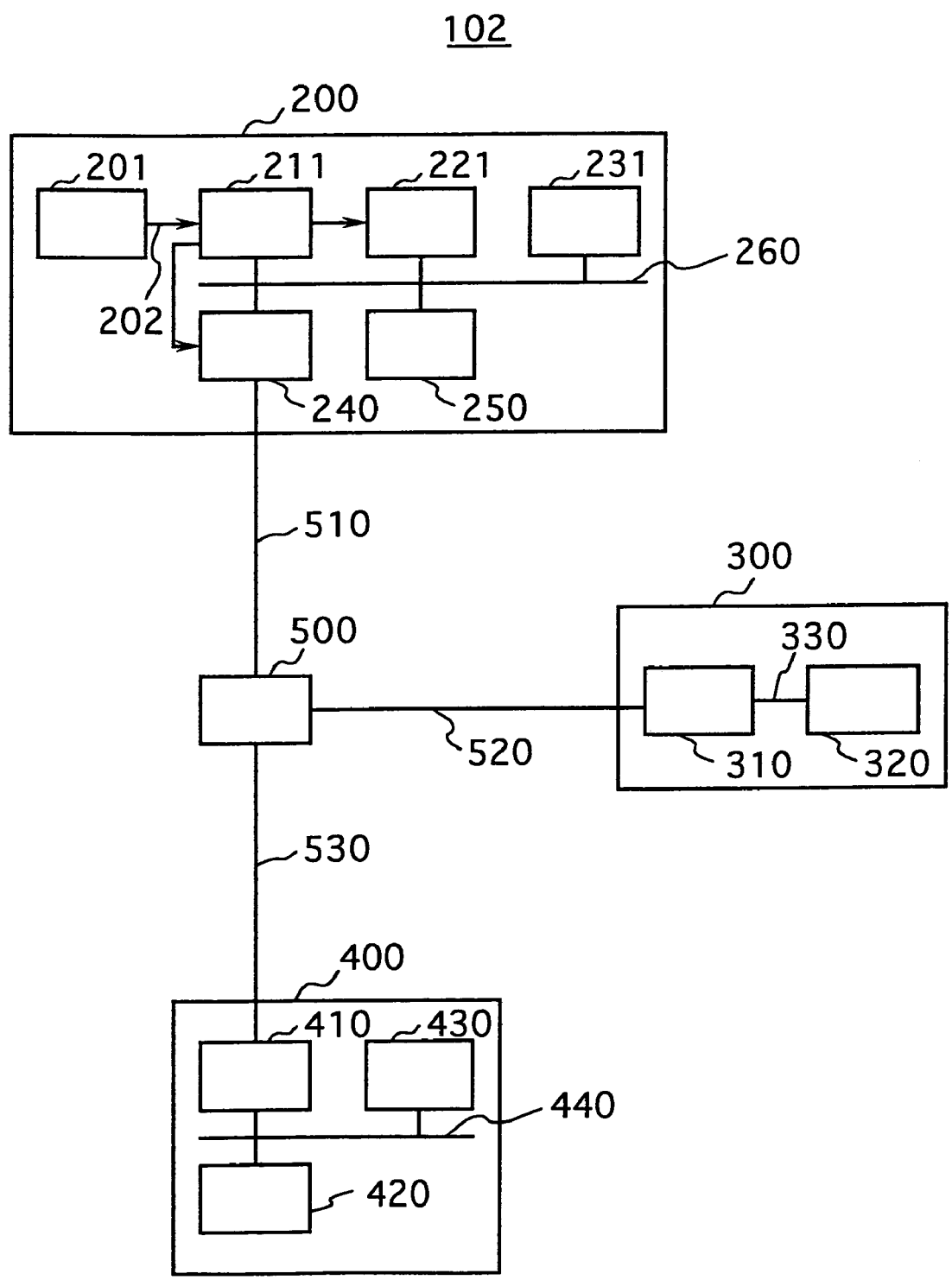
FIG. 11 is a block diagram of the process to be performed by the third embodiment of the surveillance system according to the present invention.

The surveillance system 102 according to the third embodiment of the present invention is shown in FIG. 11 as almost the same in construction as the surveillance system 100 according to the first embodiment of the present invention. In contrast to the surveillance system 100 according to the first embodiment of the present invention which comprises a camera unit 200 including a CPU 250 for controlling the signals among the exterior interface 240 electrically connected to the signal transmitting line 510, the photographing section 201, the image signal processing section 210, the moving object detecting section 220, and the chase control section 230, the surveillance system 102 according to the third embodiment of the present invention comprises a camera unit 200 which also includes a CPU 250 for controlling the signals among the exterior interface 240 electrically connected to the signal transmitting line 510, the photographing section 201, the image signal processing section 211, the moving object detecting section 221, and the chase control section 231, and the exterior interface 240.

The image signal processing section 211 of surveillance system 102 according to the third embodiment of the present invention is shown in FIG. 11 as almost the same in construction as the image signal processing section 210 of the surveillance system 100 according to the first embodiment of the present invention except for the marker 342 made up of two vertical lines and two horizontal lines to form a plurality of screen areas on the screen 320 of the display unit 300 as shown in FIG. 13 . Here, the maker of the surveillance system 102 according to the third embodiment of the present invention is shown in FIG. 13 to have nine screen areas divided on the screen 320 of the display unit 300. The moving object detecting section 221, and the chase control section 231 of the surveillance system 102 according to the third embodiment of the present invention is shown in FIG. 11 as almost the same in construction as the moving object detecting section 220, and the chase control section 230 the surveillance system 100 according to the first embodiment of the present invention shown FIG. 1. except for the fact that the object positioned in predetermined relationship with the marker 342 on the screen 320 of the display unit 300, viz., disposed in the screen area selected from among the screen areas divided by the marker 342 and designated by the operator is a chasing target.

Figure 12:
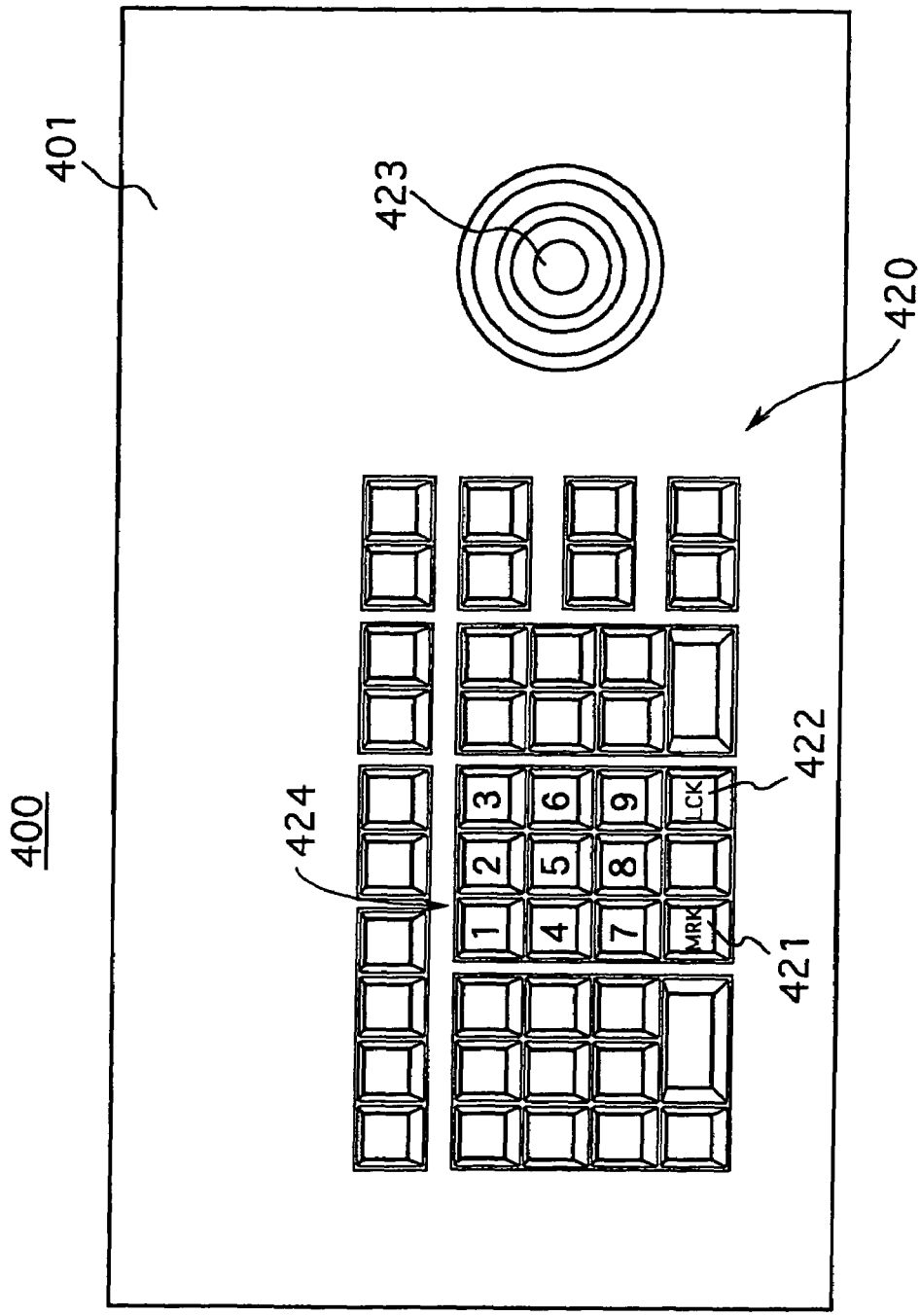
FIG. 12 is a plan view of an operation apparatus forming part of the surveillance system according to the present invention shown in FIG. 11

Here, The surveillance system 102 according to the third embodiment of the present invention is shown in FIG. 13 comprises the control unit 400 is shown in FIG. 12 to comprise a control unit body 401 having an upper surface, a plurality of keys including a key "1" to a key "9" of a numerical key operatively arranged on the control unit body 401.

The operation of the surveillance system 102 according to the present embodiment will be described hereinafter.

The operation of the surveillance system 102 according to the second embodiment is almost the same as that of the surveillance system 100 according to the first embodiment except for the following operation.

The following description will then be directed to the case that the operator is assumed to operate the surveillance system 102 while automatically chasing and watching a suspicious person as an object to be taken by the camera unit 200.

It is assumed that the specified object 351 is displayed on the screen 320 of the display unit 300 as shown in FIG. 5 and decided as a suspicious person by the operator. If the operator wants to continue automatically chasing and watching the suspicious person with the surveillance system 102, he or she pushes the MRK key 421 of the control unit 400.

With the MRK key 421 pushed by the operator, the command signal indicative of the pushed action of the MRK key 421 is inputted into the CPU 250 in a similar manner to the operation command made by the operator with the joystick 423.

Figure 16:
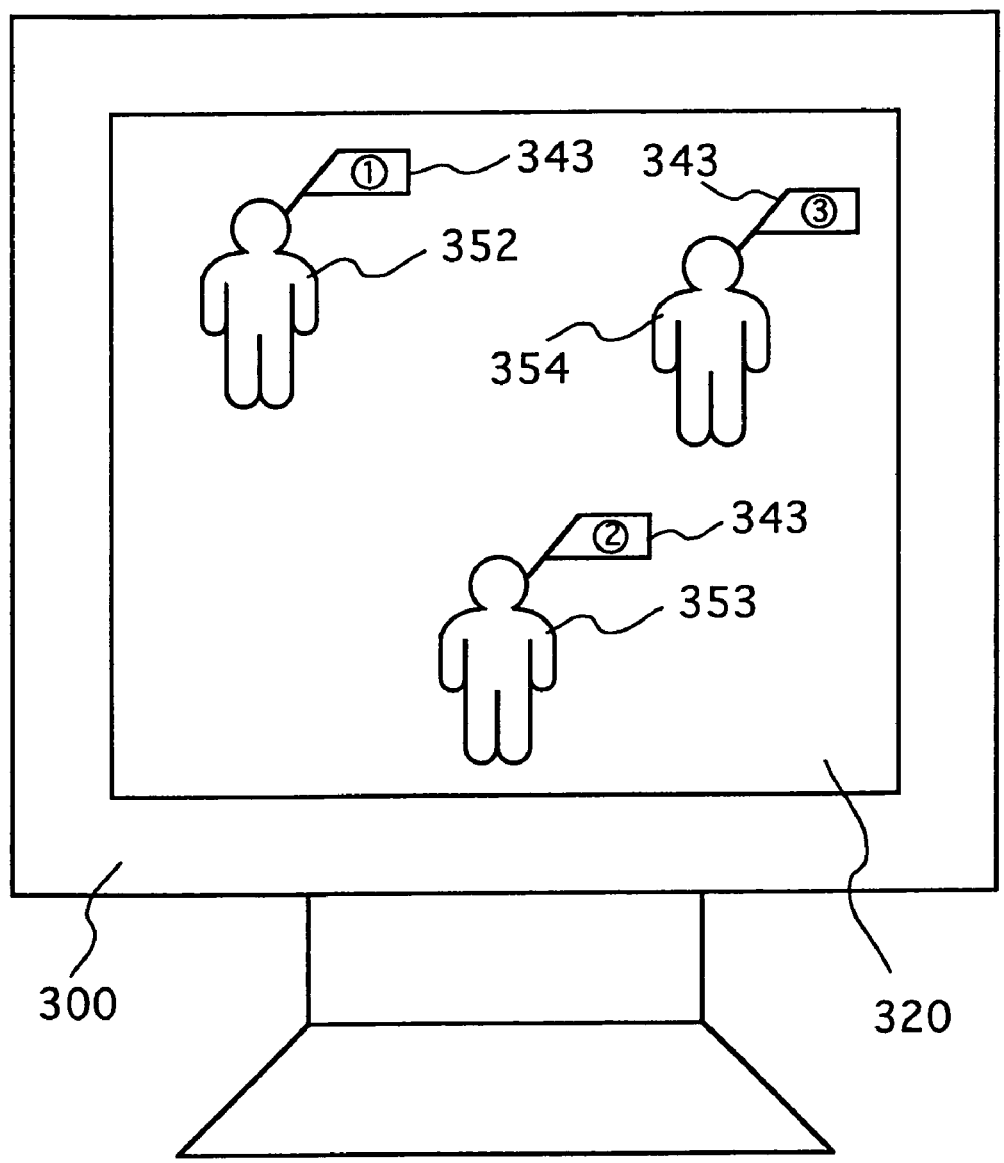
FIG. 16 is a front view of a display unit forming part of the surveillance system according to the present invention shown in FIG. 15.
Figure 18:
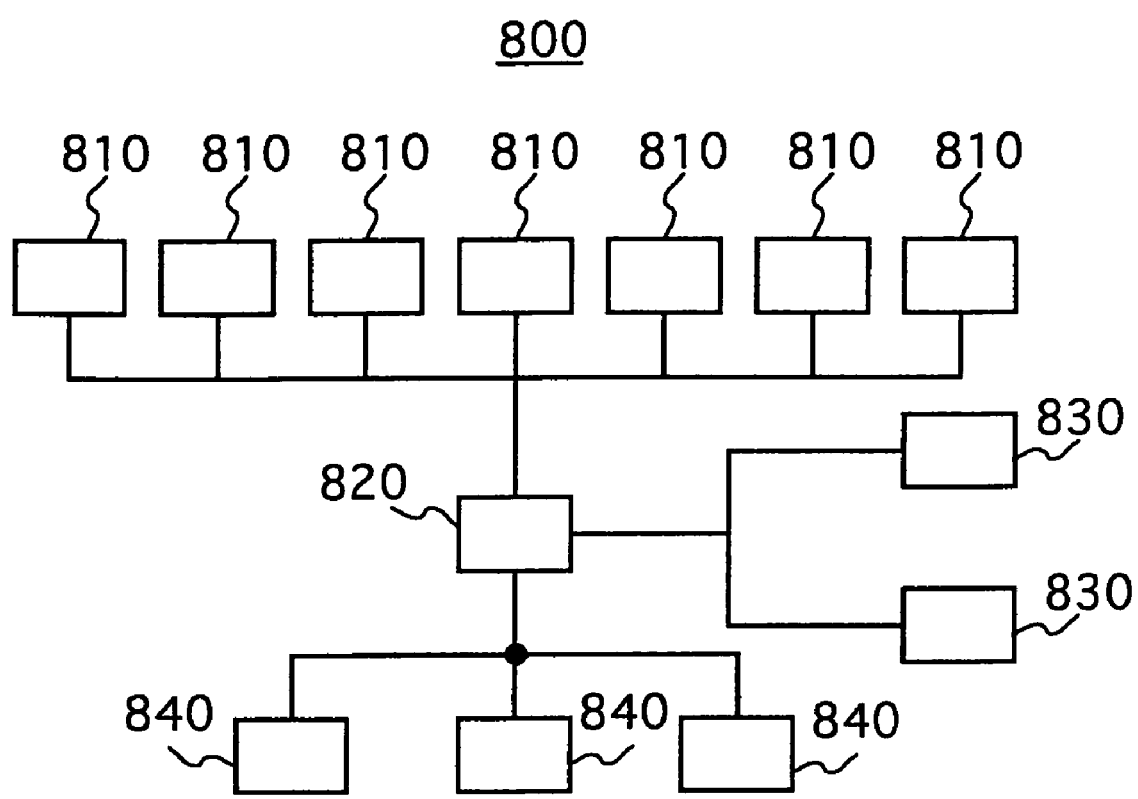
FIG. 18 is a block diagram of the process to be performed by another conventional surveillance systems.

The CPU 250 inputted with the command signal indicative of the pushed action of the MRK key 421 is operated to have the image signal processing section 211 process the image signal to be outputted to the image signal bus 202 to ensure that a marker 342 is displayed in addition to the image previously displayed as taken by the camera unit 200 on the screen 320 of the display unit 300. Here, the marker 342 is made up of two vertical lines and two horizontal lines to form nine screen areas (1) to (9). When the image signal processing section 211 is operated to process the image signal to be outputted to the image signal bus 202 to ensure that the marker 342 is displayed in addition to the image previously displayed as taken by the camera unit 200 on the screen 320 of the display unit 300, the marker 342 is displayed in addition to the image previously displayed on the screen 320 of the display unit 300 as shown in FIG. 16.

When the key "1" of the numerical keys 424 is pushed by the operator under the state that the marker 342 is added to the image shown in FIG. 5 on the screen 320 of the display unit 300 as shown in FIG. 14, the command signal indicative of the pushed action of the key "1" of the numerical keys 424 is inputted into the CPU 250 in a similar fashion to the previous pushed action of the MRK key 421.

The CPU 250 inputted with the command signal indicative of the pushed action of the key "1" of the numerical keys 424 is operated to have the moving object detecting section 221 and the chase control section 231 work together to determine as a chasing target the image of the object 351 partly disposed in the screen area (1) corresponding to the key "1" of the numerical keys 424 pushed by the operator. In order to have the moving object detecting section 221 and the chase control section 231 work together to determine as a chasing target in this example, the entire part of the object is not necessarily disposed in the screen area (1), and the part of the object disposed in the screen area (1) is acceptable in the surveillance system according to the present invention.

When the image of the object 351 is determined as a chasing target by the moving object detecting section 221 and the chase control section 231, the moving object detecting section 221 is operated to detect the image of the object 351 as determined to be a chasing target, and the chase control section 231 is at the same time operated to have the camera unit 200 perform the change of the photographing directions, magnifications and the like to ensure that the targeted object 351 is chased by the camera unit 200. This leads to the fact that the targeted object 351 is automatically and at all times displayed on the screen 320 of the display unit 300 without any operation command made by the operator.

After the CPU 250 is operated to have the moving object detecting section 221 and the chase control section 231 work together to determine the image of the object 351 superimposed by the marker 342 on the screen 320 as a chasing target, the image signal processing section 211 is operated to process the image signal to be outputted to the image signal bus 202 in order that the marker 342 is deleted from the screen 320 of the display unit 300.

From the foregoing description, it will be understood that the surveillance system 102 is operated by the operator to ensure that the object such as the suspicious person is automatically watched and chased on the screen 320 of the display unit 300.

While there has so far been described about the face that the above embodiment of the surveillance system 102 is operated to have only one object displayed on the screen 320 of the display unit 300, the surveillance system 102 according to the present invention may be operated to automatically chase and watch only one object selected from among three objects 352, 353 and 354 displayed on the screen 320 of the display unit 300. The surveillance system 102 according to the present invention which can perform the operation of automatically chasing and watching only one object selected from among many objects is especially effective for the operator to request the operation previously mentioned.

According to the present invention, the surveillance system 102 is constructed to automatically chase and watch the object when there appears only one image of the object on the screen 320 of the display unit 300. For example in the case that there appears only one image of the object on the screen 320 of the display unit 300 as shown in FIG. 5, the surveillance system 102 may be operated to automatically chase and watch only one object on the screen 320 of the display unit 300.

Though the surveillance system 102 exemplified by the present invention comprises a MRK key 421 and a LCK key 422 constituting the state setting means for selectively setting the state under which the camera unit 200 is moved and the state under which the pointer 341 is moved, the surveillance system 102 according to the present invention may comprise any other form of the state setting means as long as the state setting means can serve to selectively set either one of the above states under the condition that the CPU 250 is inputted with either one of the command signals.

The marker 342 of the above embodiment of the surveillance system 102 is of the shape as shown in FIG. 13, however, if the marker can divide the screen 320 of the display unit 300, may be of any other forms which can point the specified object on the screen 320 of the display unit 300.

The fourth embodiment of the surveillance system according to the present invention will now be described with reference to the drawings, in particular to FIG. 5, 8, 12, 15, 16.

The construction of the surveillance system 103 according to the first embodiment of the present invention will firstly be described.

Figure 15:
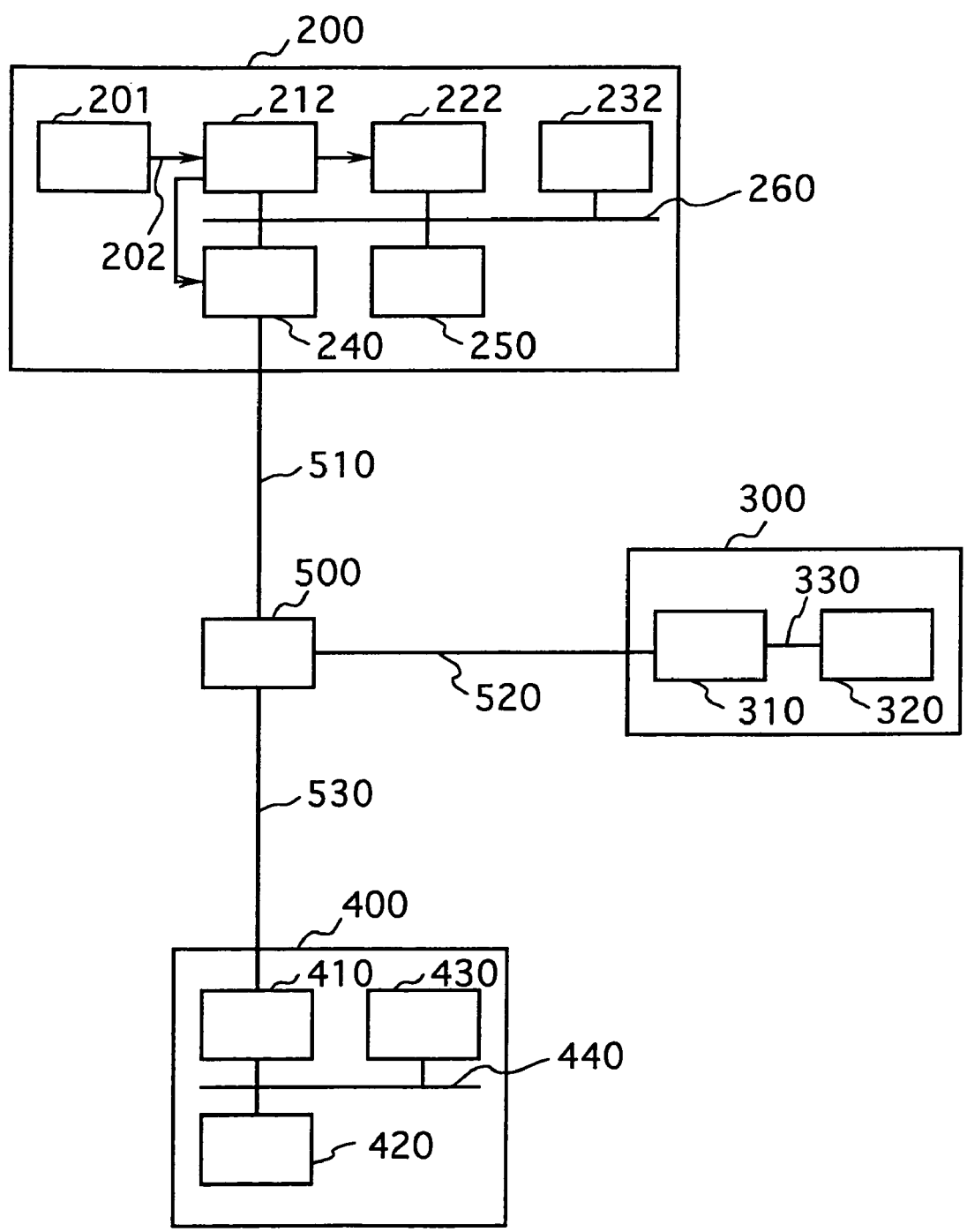
FIG. 15 is a block diagram of the process to be performed by the fourth embodiment of the surveillance system according to the present invention.

The surveillance system 103 according to the second embodiment of the present invention is shown in FIG. 15 as almost the same in construction as the surveillance system 100 according to the first embodiment of the present invention. In contrast to the surveillance system 100 according to the first embodiment of the present invention which comprises a camera unit 200 including a CPU 250 for controlling the signals among the exterior interface 240 electrically connected to the signal transmitting line 510, the photographing section 201, the image signal processing section 210, the moving object detecting section 220, and the chase control section 230, the surveillance system 101 according to the fourth embodiment of the present invention comprises a camera unit 200 which also includes a CPU 250 for controlling the signals among the exterior interface 240 electrically connected to the signal transmitting line 510, the photographing section 201, the image signal processing section 212, the moving object detecting section 222, the chase control section 232, and the exterior interface 240.

The image signal processing section 212 of surveillance system 103 according to the fourth embodiment of the present invention is shown in FIG. 15 as almost the same in construction as the image signal processing section 210 the surveillance system 100 according to the first embodiment of the present invention except for a plurality of marker 343 on the screen 320 of the display unit 300 as shown in FIG. 16.

Here, the image signal processing section 212 of the surveillance system 103 according to the third embodiment of the present invention as shown in FIG. 15 is operative to automatically allocate numerical marker (1), (2), (3) to the image of the a plural object 352, 353, 354, superimpose the marker to the image of the object on screen 320 of the display unit 300.

The moving object detecting section 222, and the chase control section 232 of the surveillance system 103 according to the third embodiment of the present invention is shown in FIG. 15 as almost the same in construction as the moving object detecting section 220, and the chase control section 230 the surveillance system 100 according to the first embodiment of the present invention shown FIG. 1 except for the fact that the object positioned in predetermined relationship with the marker 343 on the screen 320 of the display unit 300, viz., disposed in the screen area selected from among the screen areas allocated by the marker 343 and designated by the operator is a chasing target.

Here, The surveillance system 102 according to the third embodiment of the present invention is shown in FIG. 13 comprises the control unit 400 is shown in FIG. 12 to comprise a control unit body 401 having an upper surface, a plurality of keys including a key "1" to a key "9" of a numerical key operatively arranged on the control unit body 401.

The operation of the surveillance system 103 according to the present embodiment will be described hereinafter.

The operation of the surveillance system 103 according to the fourth embodiment is almost the same as that of the surveillance system 100 according to the first embodiment except for the following operation.

The following description will then be directed to the case that the operator is assumed to operate the surveillance system 103 while automatically chasing and watching a suspicious person as an object to be taken by the camera unit 200.

The surveillance system according to the present invention may be designed to determine one object as a chasing target to be automatically watched and chased on the screen 320 of the display unit 300 if what is displayed on the screen 320 of the display unit 300 is only one object. For only one object 351 on the screen 320 of the display unit 300 to be watched and chased by the operator, the surveillance system according to the present invention may be designed to be capable of automatically watching and chasing the object 351on the screen 320 of the display unit 300.

It is assumed that the specified object 352, 353 and 354 is displayed on the screen 320 of the display unit 300 as shown in FIG. 8 and decided as a suspicious person by the operator. If the operator wants to continue automatically chasing and watching the suspicious person with the surveillance system 100, he or she pushes the MRK key 421 of the control unit 400.

With the MRK key 421 pushed by the operator, the command signal indicative of the pushed action of the MRK key 421 is inputted into the CPU 250 in a similar manner to the operation command made by the operator with the joystick 423.

The CPU 250 inputted with the command signal indicative of the pushed action of the MRK key 421 is operated to have the image signal processing section 212 process the image signal to be outputted to the image signal bus 202 to ensure that the marker is displayed in addition to the image previously displayed as taken by the camera unit 200 on the screen 320 of the display unit 300. When the image signal processing section 212 is operated to process the image signal to be outputted to the image signal bus 202 to ensure that the marker 341 is displayed in addition to the image previously displayed as taken by the camera unit 200 on the screen 320 of the display unit 300, the marker 343 is displayed in addition to the image previously displayed on the screen 320 of the display unit 300 as shown in FIG. 16.

When "1" key of the numerical key 424 is pushed by the operator with the pointer 341 being superimposed with the image of the object 351 on the screen 320 of the display unit 300, the command signal indicative of the pushed action of the "1" key of the numerical key is inputted into the CPU 250 in a similar fashion to the previous pushed action of the MRK key 421.

The CPU 250 inputted with the command signal indicative of the pushed action of the "1" key of the numerical key is operated to have the moving object detecting section 220 and the chase control section 230 work together to determine the image of the object 351 superimposed by the pointer 341 on the screen 320 as a chasing target. When the image of the object 351 is determined as a chasing target by the moving object detecting section 220 and the chase control section 230, the moving object detecting section 220 is operated to detect the image of the object 351as determined to be a chasing target, and the chase control section 230 is at the same time operated to have the camera unit 200 perform the change of the photographing directions, magnifications and the like to ensure that the targeted object 351 is chased by the camera unit 200. This leads to the fact that the targeted object 351 is automatically and at all times displayed on the screen 320 of the display unit 300 without any operation command made by the operator.

After the CPU 250 is operated to have the moving object detecting section 222 and the chase control section 232 work together to determine the image of the object 352 superimposed by the marker 343 on the screen 320 as a chasing target, the image signal processing section 210 is operated to process the image signal to be outputted to the image signal bus 202 in order that the pointer 341 is deleted from the screen 320 of the display unit 300.

From the foregoing description, it will be understood that the surveillance system 103 is operated by the operator to ensure that the object such as the suspicious person is automatically watched and chased on the screen 320 of the display unit 300.

Though the surveillance system 103 exemplified by the present invention comprises a MRK key 421 and a LCK key 422 constituting the state setting means for selectively setting the state under which the camera unit 200 is moved and the state under which the pointer 341 is moved, the surveillance system 100 according to the present invention may comprise any other form of the state setting means as long as the state setting means can serve to selectively set either one of the above states under the condition that the CPU 250 is inputted with either one of the command signals.

The marker 343 of the above embodiment of the surveillance system 100 is of the shape as shown in FIG. 16, however, may be of any other forms which can overlap the specified object on the screen 320 of the display unit 300.

As will be described in the above, the surveillance system according to the present invention can designate the object desired by the operation to be automatically watched and chased by the camera unit and displayed on the display unit.

While the subject invention has been described with relation to the preferred embodiments, various modifications and adaptations thereof will now be apparent to those skilled in the art as far as such modifications and adaptations fall within the scope of the appended claims intended to be covered thereby.

What is claimed is:

1. A surveillance system for watching objects, comprising:
    a camera unit for transforming an image indicative of said objects into an image signal and outputting said image signal;
    a display unit having a screen and operative to transform said image signal outputted by said camera unit into an image to be displayed on said screen, said display unit including marker displaying means for displaying a marker on said screen, and chasing target determining means for selecting as a chasing target one object from among said objects displayed on said screen by determining whether or not said marker is positioned on said screen in predetermined relationship with said object to be selected as said chasing target; and
    a control unit for controlling said camera unit and said display unit, said control unit including a joystick operative to be inclined at its desired angular positions to output position signals respectively responsive to said desired angular positions, signal controlling means for receiving said position signals outputted by said joystick, said signal controlling means being operative to assume two controlling states consisting of a first controlling state to control said driving operation of said camera unit, and a second controlling state to control said movement of said marker on said screen in response to said position signals to ensure that said marker is positioned on said screen in predetermined relationship with said object to be selected as said chasing target, the photographing direction of said camera unit not being changed when said signal controlling means is in said second controlling state, and setting means for having said signal controlling means selectively assume said first and second controlling states, wherein said camera unit including an image signal processing section for processing said image signal, and a moving object detecting section for detecting a moving object from said image to be displayed on said screen, said image signal processing section is operative to allocate numerical markers to ojects each detected as said moving object by said moving object detecting section, and to superimpose said numerical markers to said detected moving objects, and said camera unit is operative to automatically chase said object selected as said chasing target to ensure that said object selected as said chasing target is displayed on said screen.

2. A surveillance system as set forth in claim 1, in which said marker is constituted by a pointer, and said chasing target determining means is operative to determine said object superimposed by said pointer as said chasing target among said images displayed on said screen.

3. A surveillance system as set forth in claim 2, in which said marker displaying means is operative to display said pointer on said screen when said signal controlling means is in said second controlling state to control said movement of said pointer on said screen in response to said position signals.

4. A surveillance system as set forth in claim 1, in which said marker forms a plurality of screen areas on said screen, and said chasing target determining means is operative to determine said object positioned within one predetermined screen area on said screen as said chasing target among said images displayed on said screen.

5. A surveillance system as set forth in claim 1, in which said marker displaying means is operative to display said marker on said screen in superimposed relationship with said object, and said chasing target determining means is operative to determine said object on said screen in superimposed relationship with said marker as said chasing target among said markers displayed on said screen.

6. A surveillance system as set forth in claim 1, in which said chasing target determining means is operative to determine only one object as said chasing target to automatically be chased when said object is displayed on said screen.

7. A surveillance system as set forth in claim 4, in which said marker is made up of vertical lines and horizontal lines to form said plurality of screen areas on said screen.

8. A surveillance system as set forth in claim 4, in which said control unit further includes a plurality of numerical keys which are selectively pushed by an operator, and which are respectively related to said screen areas, and said chasing target determining means is operative to select as a chasing target one object from among said objects displayed on said screen, when said numerical keys are selectively pushed by an operator, by determining whether or not said object to be selected as said chasing target is positioned on said screen in predetermined relationship with one screen area related to one numerical key pushed by an operator.

9. A surveillance system as set forth in claim 1, in which said setting means is constituted by a MRK key and a LCK key all of which are selectively pushed by an operator, and said setting means is adapted to have said signal controlling means assume said first controlling state when said LCK key is pushed by said operator, and to have signal controlling means assume said second controlling state when said MRK key is pushed by said operator.

* * * * *